United States Patent
Kirsner et al.

(10) Patent No.: US 7,534,743 B2
(45) Date of Patent: May 19, 2009

(54) INVERT DRILLING FLUIDS AND METHODS OF DRILLING BOREHOLES

(75) Inventors: Jeff Kirsner, Humble, TX (US); Don Siems, Houston, TX (US); Kimberly Burrows-Lawson, Kingwood, TX (US); David Carbajal, Houston, TX (US); Ian Robb, Duncan, OK (US); Dale E. Jamison, Humble, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/633,703

(22) Filed: Dec. 5, 2006

(65) Prior Publication Data

US 2007/0078060 A1 Apr. 5, 2007

Related U.S. Application Data

(63) Continuation of application No. 10/292,124, filed on Nov. 12, 2002, now Pat. No. 7,456,135, which is a continuation-in-part of application No. 10/175,272, filed on Jun. 19, 2002, now Pat. No. 6,887,832, which is a continuation-in-part of application No. 09/929,465, filed on Aug. 14, 2001, now abandoned, and a continuation-in-part of application No. PCT/US00/35609, filed on Dec. 29, 2000, and a continuation-in-part of application No. PCT/US00/35610, filed on Dec. 29, 2000.

(51) Int. Cl.
*C09K 8/36* (2006.01)
*E21B 21/00* (2006.01)

(52) U.S. Cl. .................. 507/103; 175/65; 507/138; 507/136; 507/140; 516/21

(58) Field of Classification Search ............... 507/103, 507/138, 136, 140; 175/65; 516/21
See application file for complete search history.

(56) References Cited

U.S. PATENT DOCUMENTS

| | | | |
|---|---|---|---|
| 2,816,073 A | 12/1957 | Stratton | |
| 2,873,253 A | 2/1959 | Stanphill | |
| 2,994,660 A | 8/1961 | Reddie et al. | |
| 3,127,343 A | 3/1964 | Reddie et al. | |
| 3,654,177 A | 4/1972 | Foley | |
| 3,684,012 A | 8/1972 | Scheffel et al. | |
| 3,709,819 A | 1/1973 | Browing | |
| 3,728,277 A | 4/1973 | Foley | |
| 3,878,110 A | 4/1975 | Miller et al. | |
| 3,878,117 A | 4/1975 | Williams et al. | |
| 3,912,683 A | 10/1975 | O'Farrell | |
| 3,954,627 A | 5/1976 | Dreher et al. | |
| 3,988,246 A | 10/1976 | Hartfiel | |
| 4,007,149 A | 2/1977 | Burton et al. | |
| 4,010,111 A | 3/1977 | Chappel et al. | |
| 4,012,329 A | 3/1977 | Hayes et al. | |
| 4,142,595 A | 3/1979 | Anderson et al. | |
| 4,148,821 A | 4/1979 | Nussbaum et al. | |
| 4,151,096 A | 4/1979 | Jackson | |
| 4,153,588 A | 5/1979 | Makowski et al. | |
| 4,240,915 A | 12/1980 | Block | |
| 4,255,268 A | 3/1981 | Block | |
| 4,264,455 A | 4/1981 | Block | |
| 4,366,070 A | 12/1982 | Block | |
| 4,390,474 A | 6/1983 | Nussbaum et al. | |
| 4,422,927 A | 12/1983 | Dorsey et al. | |
| 4,422,947 A | 12/1983 | Dorsey et al. | |
| 4,425,462 A | 1/1984 | Turner et al. | |
| 4,428,845 A | 1/1984 | Block | |
| 4,447,338 A | 5/1984 | Lundberg et al. | |
| 4,473,479 A | 9/1984 | Block | |
| 4,487,860 A * | 12/1984 | Winner et al. | ............... 523/408 |
| 4,488,975 A | 12/1984 | Almond | |
| 4,508,628 A | 4/1985 | Walker et al. | |
| 4,552,215 A | 11/1985 | Almond et al. | |
| 4,553,601 A | 11/1985 | Almond et al. | |

(Continued)

FOREIGN PATENT DOCUMENTS

AU B-75143/94 A1 9/1989

(Continued)

OTHER PUBLICATIONS

"Altonic Product Sheet", CONDEA! Online! XP 0022164097; URL:http://www.condea.de/products/surfactanta/surfactanta_nonionic/alfonic.html.

(Continued)

*Primary Examiner*—Timothy J Kugel
(74) *Attorney, Agent, or Firm*—Craig W. Roddy; Karen B. Tripp

(57) ABSTRACT

Methods for drilling, running casing in, and/or cementing a borehole in a subterranean formation without significant loss of drilling fluid are disclosed, as well as compositions for use in such methods. The methods employ drilling fluids comprising fragile gels or having fragile gel behavior and providing superior oil mud rheology and overall performance. The fluids are especially advantageous for use in offshore wells because the fluids exhibit minimal differences between downhole equivalent circulating densities and surface densities notwithstanding differences in drilling or penetration rates. When an ester and isomerized olefin blend is used for the base of the fluids, the fluids make environmentally acceptable and regulatory compliant invert emulsion drilling fluids.

57 Claims, 12 Drawing Sheets

U.S. PATENT DOCUMENTS

| | | |
|---|---|---|
| 4,559,233 A | 12/1985 | Chen et al. |
| 4,619,772 A | 10/1986 | Black et al. |
| 4,659,486 A | 4/1987 | Harmon |
| 4,670,501 A | 6/1987 | Dymond et al. |
| 4,671,883 A | 6/1987 | Connell et al. |
| 4,675,119 A | 6/1987 | Farrar |
| 4,713,183 A | 12/1987 | Patel |
| 4,777,200 A | 10/1988 | Dymond et al. |
| 4,787,990 A | 11/1988 | Boyd |
| 4,802,998 A | 2/1989 | Mueller et al. |
| 4,810,355 A | 3/1989 | Hopkins |
| 4,816,551 A | 3/1989 | Oehler et al. |
| 4,900,456 A | 2/1990 | Ogilvy |
| 4,964,615 A | 10/1990 | Mueller et al. |
| 4,986,784 A | 1/1991 | French et al. |
| 5,027,901 A | 7/1991 | Coates et al. |
| 5,045,219 A | 9/1991 | Trahan et al. |
| 5,106,516 A | 4/1992 | Mueller et al. |
| 5,189,012 A | 2/1993 | Patel et al. |
| 5,232,910 A | 8/1993 | Mueller et al. |
| 5,237,080 A | 8/1993 | Daute et al. |
| 5,252,554 A | 10/1993 | Mueller et al. |
| 5,254,531 A | 10/1993 | Mueller et al. |
| 5,308,401 A | 5/1994 | Geke et al. |
| 5,318,954 A | 6/1994 | Mueller et al. |
| 5,318,955 A | 6/1994 | Mueller et al. |
| 5,318,956 A | 6/1994 | Mueller et al. |
| 5,330,662 A | 7/1994 | Jahnke et al. |
| 5,333,698 A | 8/1994 | Van Slyke |
| 5,382,290 A | 1/1995 | Nahm et al. |
| 5,403,508 A | 4/1995 | Reng et al. |
| 5,403,822 A | 4/1995 | Mueller et al. |
| 5,407,909 A | 4/1995 | Goodhue, Jr. et al. |
| 5,432,152 A | 7/1995 | Dawson et al. |
| 5,441,927 A | 8/1995 | Mueller et al. |
| 5,461,028 A | 10/1995 | Mueller et al. |
| 5,498,596 A | 3/1996 | Ashjian et al. |
| 5,508,258 A | 4/1996 | Mueller et al. |
| 5,552,462 A | 9/1996 | Yeh |
| 5,569,642 A | 10/1996 | Lin |
| 5,589,442 A | 12/1996 | Gee et al. |
| 5,591,699 A | 1/1997 | Hodge |
| 5,605,879 A | 2/1997 | Halliday et al. |
| 5,607,901 A | 3/1997 | Toups, Jr. et al. |
| 5,620,946 A | 4/1997 | Jahnke |
| 5,635,457 A | 6/1997 | Van Slyke |
| 5,710,110 A | 1/1998 | Cooperman et al. |
| 5,744,677 A | 4/1998 | Wu |
| 5,789,352 A | 8/1998 | Carpenter et al. |
| 5,837,655 A | 11/1998 | Halliday et al. |
| 5,846,913 A | 12/1998 | Sawdon |
| 5,849,974 A | 12/1998 | Clarembeau et al. |
| 5,851,958 A | 12/1998 | Halliday et al. |
| RE36,066 E | 1/1999 | Mueller et al. |
| 5,868,434 A | 2/1999 | Mueller et al. |
| 5,869,433 A | 2/1999 | Patel |
| 5,869,434 A | 2/1999 | Mueller et al. |
| 5,877,378 A | 3/1999 | Overstreet et al. |
| 5,883,054 A | 3/1999 | Hernandez |
| 5,909,779 A | 6/1999 | Patel et al. |
| 5,929,297 A | 7/1999 | Theriot et al. |
| 5,958,845 A | 9/1999 | Van Slyke |
| 5,960,878 A | 10/1999 | Nguyen et al. |
| 5,989,336 A | 11/1999 | Carpenter et al. |
| 6,001,790 A | 12/1999 | Schmitt et al. |
| 6,006,831 A | 12/1999 | Schlemmer |
| 6,017,854 A | 1/2000 | Van Slyke |
| 6,022,833 A | 2/2000 | Mueller et al. |
| 6,034,037 A | 3/2000 | Van Slyke |
| 6,090,754 A | 7/2000 | Chan et al. |
| 6,107,255 A | 8/2000 | Van Slyke |
| 6,110,874 A | 8/2000 | Van Slyke |
| 6,159,906 A | 12/2000 | McNally et al. |
| 6,165,946 A | 12/2000 | Mueller et al. |
| 6,180,572 B1 | 1/2001 | Mueller et al. |
| 6,187,719 B1 | 2/2001 | Dino et al. |
| 6,204,224 B1 | 3/2001 | Quintero et al. |
| 6,211,119 B1 | 4/2001 | Herold et al. |
| 6,289,989 B1 | 9/2001 | Mueller |
| 6,339,048 B1 | 1/2002 | Santhanam et al. |
| 6,451,953 B1 | 9/2002 | Albright |
| 6,462,096 B1 | 10/2002 | Dino et al. |
| 6,515,031 B2 | 2/2003 | Fefer |
| 6,589,917 B2 | 7/2003 | Patel et al. |
| 6,620,770 B1 | 9/2003 | Kirsner et al. |
| 6,828,279 B2 | 12/2004 | Patel et al. |
| 6,861,393 B2 | 3/2005 | Temple et al. |
| 6,887,832 B2 | 5/2005 | Kirsner et al. |
| 6,908,887 B2 | 6/2005 | Thaemlitz |
| 6,989,353 B2 | 1/2006 | Temple et al. |
| 7,008,907 B2 | 3/2006 | Kirsner et al. |
| 7,728,485 | 10/2007 | Kirsner |
| 2001/0009890 A1 | 7/2001 | Patel et al. |
| 2003/0036484 A1 | 2/2003 | Kirsner et al. |
| 2003/0064897 A1 | 4/2003 | Krisner et al. |
| 2003/0114316 A1 | 6/2003 | Patel et al. |
| 2003/0144153 A1 | 7/2003 | Krisner et al. |
| 2004/0043905 A1 | 3/2004 | Miller et al. |
| 2004/0082483 A1 | 4/2004 | Muller et al. |
| 2004/0102332 A1 | 5/2004 | Thompson et al. |
| 2004/0110642 A1 | 6/2004 | Thompson et al. |
| 2004/0152603 A1 | 8/2004 | Kirsner et al. |
| 2004/0171498 A1 | 9/2004 | Miller |
| 2005/0032652 A1 | 2/2005 | Kirsner et al. |
| 2005/0049147 A1 | 3/2005 | Patel et al. |
| 2005/0137093 A1 | 6/2005 | Miller |
| 2006/0073987 A1 | 4/2006 | Mueller et al. |
| 2007/0078060 A1 | 4/2007 | Kirsner et al. |
| 2007/0078061 A1 | 4/2007 | Kirsner et al. |
| 2007/0078062 A1 | 4/2007 | Kirsner et al. |
| 2007/0082822 A1 | 4/2007 | Kirsner et al. |
| 2007/0082824 A1 | 4/2007 | Bell |

FOREIGN PATENT DOCUMENTS

| | | |
|---|---|---|
| AU | B-75043/94 | 3/1995 |
| CA | 2 088 697 | 2/1992 |
| CA | 2088697 | 2/1992 |
| DE | 40 18 228 | 12/1991 |
| DE | 40 18 228 A | 12/1991 |
| DE | 4018228 | 12/1991 |
| DE | 44 20 455 A | 12/1995 |
| DE | 4420 455 A1 | 12/1995 |
| DE | 196 43 840 A1 | 5/1998 |
| DE | 196 43 857 | 5/1998 |
| DE | 196 43 857 A1 | 5/1998 |
| DE | 196 43 840 A | 7/1998 |
| EP | 0 124 194 A2 | 11/1984 |
| EP | 0 134 173 | 3/1985 |
| EP | 0 134 173 A1 | 3/1985 |
| EP | 0 254 412 A2 | 1/1988 |
| EP | 0 561 608 A | 9/1993 |
| EP | 0 247 801 A2 | 12/1997 |
| EP | 1 111 024 A1 | 6/2001 |
| EP | 1 424 380 A1 | 6/2004 |
| GB | 2166782 | 5/1986 |
| GB | 2212192 A | 7/1989 |
| GB | 2287052 B | 3/1996 |
| GB | 2309240 A | 7/1997 |
| WO | WO 83/00249 | 9/1983 |
| WO | WO 83/02949 | 9/1983 |
| WO | WO 93 23491 A | 11/1993 |
| WO | WO 93/23491 A1 | 11/1993 |
| WO | WO 94/16030 | 7/1994 |

| | | |
|---|---|---|
| WO | WO 95/09215 | 4/1995 |
| WO | WO 95/21225 | 8/1995 |
| WO | WO 95 26386 | 10/1995 |
| WO | WO 96 22342 | 7/1996 |
| WO | WO 96/22342 A1 | 7/1996 |
| WO | WO 98/18882 | 5/1998 |
| WO | WO 99 50370 A | 10/1999 |
| WO | WO 00 71241 A | 11/2000 |
| WO | WO 00/71241 A1 | 11/2000 |
| WO | WO 02/053675 A | 7/2002 |
| WO | WO 02/053676 A1 | 7/2002 |

OTHER PUBLICATIONS

Chapter 13, Synthetic, Bariod Fluids Handbook, Revised Aug. 1, 1997.
P. A. Boyd, D.L. Whitfill, T. S. Carter, and J. P. Allamon, New Based Oil Used in Low Toxicity Oil Muds, 1985.
Friedheim, J. E., "Second Generation Drilling Fluids", 1996.
"Bio-Bore" (TM) Horizontal Directional Drilling Fluid OCncentrate, Baroid Products Data Sheet.
Seheult, Grebell, Traweek, Jr., Dudley, "Biopolymer Fluids Eliminates Horizaontal Well Problems", 1990.
Byrd, Zamora, "Fluids are Key in Drilling Highly Deviated Wells", 1988.
Hart's E&P, 2003 MEA Winners, pp. 92-110 (Apr. 2003).
Halliburton Energy Services, Baroid Technology, Eng. & Dev. Lab. Tech. Serv. (TS-2058) Dimer & Trimer Eval. As Primary Viscosifiers Using "PETROFREE" Apr. 17, 2001.
Halliburton Energy Services, Baroid Technology, Eng. & Dev. Lab. Tech. Serv. (TS-2055) Addition of Dimer & Trimer Modifiers to MI Novadril Drilling Fluid Apr. 4, 2001.
Halliburton Energy Services, Baroid Technology, Eng. & Dev. Lab. Tech. Serv. (TS-2039) Primary Rheological Eval. Using Various Dimer & Trimer Acids, Feb. 21, 2001.
Halliburton Energy Services, Baroid Technology, Eng. & Dev. Lab. Tech. Serv. (TS-2037) Primary Rheological Eval. Using Various Dimer & Trimer Acids, Feb. 21, 2001.
Halliburton Energy Services, Baroid Technology, Eng. & Dev. Lab. Tech. Serv. (TS-2065) Dimer & Trimer Low End Rheology Modifier Study at Higher Conc. & Temp, Jun. 12, 2001.
Baroid, A. Halliburton Co., Report FM-0691, Proj.Q3767, Formulation WOrk on an 11, 14 & 16lb/gal IO drilling flui, Internal Memorandum, Nov. 5, 1999.
Baroid Drilling Fluids, Res. & Eng. & Anal. Serv/Support (TS-0724), Fann 70 Analysis of PETROFREE Muds Nov. 12, 1993.
Baroid report No. EMB-5680, Project No. M386. Aug. 8, 1995.
Baroid report No. EMB-5723, Project No. M565, Dec. 11, 1995.
Baroid report No. EMB-5718, Project No. M630, Dec. 1, 1995.
Baroid Drilling Fluids, Res. & Eng. & Anal. Serv/Support (TS-1146S1), Compound of Downhole Rheological & Suspension Prop. of A PETROFREE mud vs. a PETROFREE LE mud. Nov. 22, 1996.
Baroid Drilling Fluids, Res. & Eng. & Anal. Serv/Support (TS-0865), Composition of a 13.4lb/gal PETROFREE mud, Dec. 16, 1994.
Baroid Drilling Fluids, Res. & Eng. & Anal. Serv/Support (EMB 5520), Analysis of PETROFREE Muds & Coatings from a well Jan. 27, 1995.
Halliburton, Baroid Tech. Eng. & Dev. Lab. Internal Mem., Report No. FM 1376, Project No. Q895 Fann 75 Rheological Properties on the NovaPLus fluids. Jul. 30, 2002.
Baroid, a Halliburton Company, Internal Mem., Report No. FM-80804, Project No. Q4701, Fann 75 on an Nova Plus field mud, May 1, 2000.
Baroid Drilling Fluids, Res. & Eng. & Anal. Serv/Support (TS-0842), Eval. & Reconditioning of a PETROFREE mud, Oct. 7, 1994.
Baroid Drilling Fluids, Res. & Eng. & Anal. Serv/Support (TS-1193), Analysis of a PTROFREE LE muds to Determine the Cause of High Viscosities at Cold Temp., Jan. 30, 1997.
Baroid, A Halliburton Company, Res. & Eng. Tech & Anal. Serv./Support (FS-0082), Field Support for Utilizing 13.0 lb/gal 75/PETROFREE SF Drilling Fluid Feb. 4, 2000.
Baroid Drilling Fluids, Res. & Eng. Tech& Anal. Serv./Support Field Services (FS-0058S2) relating to PETROFREE LE Jan. 24, 1997.
Baroid Drilling Fluids, Res. & Eng. Tech& Anal. Serv./Support Field Services for Utilizing an 11/2 lb/gal PETROFREE IO Drilling Fluid Dec. 29, 1999.
Baroid Drilling Fluids, Res. & Eng. Tech& Anal. Serv./Support (TS-0870), Formulation of a Low Yield Point Mud Jan. 11, 1995.
Baroid Drilling Fluids, Res. & Eng. Tech& Anal. Serv./Support (TS-0494), a 15lb/gal PETROFREE formulation Nov. 22, 1991.
Baroid Drilling Fluids, Res. & Eng. Tech& Anal. Serv./Support (TS-0485), 300F Static Aging Evaluation of PETROFREE vs Enviromul Nov. 6, 1991.
Baroid Drilling Fluids, Res. & Eng. Tech& Anal. Serv./Support Field Service Report Dec. 2, 1996 to Dec. 16, 1996 (FS-0058S) Feb. 11, 1997.
Evaluation of a Filed Trial of PETROFREE LV, Final Sample collected before running casing , Jul. 25, 200 (HAL0021065) one page.
Baroid's Environmentally Safe Fluids PETROFREE LV, ACCO-LADE (Hal0028402-Hal0028433).
Comparison of PETROFREE, Internal Olefin, and Low Viscosity Ester Muds, 40 F to 250 F, 0ppsi to 12,000 psi (not dated) 16 pgs.
Baroid, Halliburton, Low Voscisity Ester Fluids Technical Review ( not dated) 50 pages.
Baroid Eng & Res. Lab., Comparative Data, PETROFREE SF & PETROFREE LE, 11.00lb/gal, 70/30 OWR.
Baroid, A Halliburton Company, Internal Memorandum, Report No. FM-0700, Project No. Q3854, Extended Gel Strengths for a Low Viscosity Ester and a PETROFREE mud Nov. 11, 1999.
Baroid Drilling Fluids, Res. & Eng. Tech. & Anal. Serv/Support (EMB-5696), Adjustment of a Stored PETROFREE mud to meet Specifications Required, Oct. 6, 1995.
Thinner Evaluation 11.0lb/gal, 70/30 OWR PETROFREE mud, Thinners evaluated: COLDROL, ATC. BDF-239, QMC 42, Deep-Treat (Hal002174-2179).
Westport Technology Center Internatinal, Drilling Fluids, and Cement, Analysis of a Baroid PETROFREE Synthetic Mud, WTCI-94-133, Nov. 1994.
Mi Versamul Multi-purpose emulsifier Product Bulletin (2pages) 1996.
Deposition Transcript of Heinz Mueller in Civ. Action 6:05-CV-155, *Halliburton* v *MI*, US Dist Ct. Eastern District of Texas, Oct. 11, 2006.
Halliburton's Opposition to Defendant's Motion for Summary Judgment of Invalidity in Civ. Action 6:05-cv-155, *Halliburton* v *MI*, US Disct. Ct. Eastern Dist. of Texas.
Memorandum and Opinion of Court signed Oct. 18, 2006 in Civ. Action 6:05-cv-155, *Halliburton* v *MI*, US Disct. Ct. Eastern Dist. of Texas, granting Motion for Summary Judgment.
U.S. PTO Office action of Nov. 10, 2005 in U.S. Appl. No. 10/656,684.
U.S. PTO Office action of Jul. 21, 2006 in U.S. Appl. No. 10/656,684.
U.S. PTO Office action of Jul. 17, 2006 in U.S. Appl. No. 10/933,560.
U.S. PTO Office action of Jun. 4, 2004 in U.S. Appl. No. 10/175,272.
U.S. PTO Notice of Allowance Dec. 1, 2004 in U.S. Appl. No. 10/175,272.
U.S. PTO Office action of Jun. 27, 2006 in U.S. Appl. No. 10/432,787.
PCT International Search Report in PCT/US00/35609 Corresponding to U.S. Appl. No. 10/432,787, 2000.
U.S. PTO Office action of Oct. 4, 2002 in U.S. Appl. No. 09/929,465.
U.S. PTO Office action of Jun. 24, 2003 in U.S. Appl. No. 09/929,465.
U.S. PTO Office action of Apr. 16, 2004 in U.S. Appl. No. 09/929,465.
U.S. PTO Office action of Jan. 21, 2005 in U.S. Appl. No. 09/929,465.
U.S. PTO Office action of Sep. 29, 2005 in U.S. Appl. No. 09/929,465.
U.S. PTO Notice of Allowance of Apr. 11, 2006 in U.S. Appl. No. 09/929,465.
U.S. PTO Office action of May 31, 2006 in U.S. Appl. No. 10/761,552.
U.S. PTO Office action of Sep. 15, 2006 in U.S. Appl. No. 10/432,786.

U.S. PTO Office action of Dec. 28, 2005 in U.S. Appl. No. 10/432,786.

PCT International Search Report in PCT/US00/35610 Corresponding to U.S. Appl. No. 10/432,786, 2003.

EPC Article 96 (2) Examination Report of Feb. 10, 2006 for European Patent Application No. 00989596.2 Corresponding to U.S. Appl. No. 10/432,786.

EPC Article 96 (2) Examination Report of Apr. 20, 2006 for European Patent Application No. 00989597.0-Corresponding to U.S. Appl. No. 10/432,787.

E.Van Oort, et al., "New Flat-Rheology Synthetic-Based Mud for Improved Deepwater Drilling", SPE 90987, pp. 1-11, SPE Annual Tech. Conf. & Exh., Houston, TX Sep. 26-29, 2004.

P.A. Bern, et al., "The Influence of Drilling Variables on Barite Sag", SPE 36670, 8 pages, pp. 887-894, SPE Annual tech. Conf. & Exh., Houston, TX, Oct. 6-9, 1996.

Dow Tergitol, Surfacants Product Information Sheet from www.dow.com/surfacants/products/nonlph.html. retreived on Mar. 11, 2005.

Shell Neodol Product information Sheets from www.shellchemicals.com/neodol/1,1098,506.html. retrieved on Mar. 11, 2005.

Litigation Documents regarding US patent 6,887,832 B2, Issued May 3, 2005, being filed herewithin in accord with MPEP 2001.06(c).

Defendant M-I, Reply in Support of it's Motion for Summary Judgement of Invalidity with Respect to US Patent 6,887,832 with Exhibits, Apr. 18, 2006.

M-I, LLC's Responsive Brief on the Construction of the Asserted Calims of US Patent 6,887,832 with Exhibits, Apr. 18, 2006.

Halliburton's Unopposed Motion for Leave to Exceed Page Limit for it's Surreply in Opposition to M-I's Motion for Summary Judgement of Invalidity with the Surreply and other, Apr. 28, 2006.

Halliburton's Unopposed Motion for Leave to Exceed Page Limit for Reply Brief on Claim Construction with the Reply Brief and other Exhibits, Apr. 28, 2006.

Baroid Drilling Fluids, Inc. Brochure Entitled "PETROFREE TM The Biodegradable Solution for High-Performance Drilling", (1998) 8 pages.

A. Samuels, "H2S Need Not Be Deadly, Dangerous, Destructive", Soc. of Petroleum Engineers, SPE 5202, (1974).

R.K. Clark, et al., "Polyacrylamide/Potassium-Chloride Mud for Drilling Water Sensitive Shales", J. Petroleum Tech. 719-729 SPE 5514 (Jun. 1976).

J.E. Friedhiem ,et al., "An Environmentally Superior Replacement for Mineral-Oil Drilling Fluids", 299-312 SPE 23062 (Sep. 3-6, 1991).

J.H. Rushing, et al., "Bioaccumulation from Mineral Oil-Wet and Synthetic Liquid-Wet Cuttings on an Estruarine Fish", 311-320, SPE 23350 (Nov. 10-14, 1991).

F.V.Jones, et al., "The Chronic Toxicity of Mineral Oil-Wet and Synthetic Liquid-Wet Cuttings on an Estruarine Fish, Fundulus Grandis", 721-726, SPE 23497 (Nov. 10-13, 1991).

J.E. Friedhiem ,et al., "Superior Performance with Minimal Environmental Impact: A Novel Nonaqueous Drilling Fluid", 713-726, SPE 25753 (Feb. 23-25, 1993).

S. Park, et al., "The Success of Synthetic-Based Drilling Fluids Offshore Gulf of Mexico: A Field Comparison to Conventional Systems", 405-418, SPE 26354 (1993).

M. Slater, "Commanly Used Biodegradation Techniques for Drilling Fluid Chemicals, Are They Appropriate", 387-397, SPE/IADC 29376 (1995).

J. Chandler, et al., "Seafloor Monitoring for Synthetic-Based Mud Discharged in the Western Gulf of Mexico", 51-69, SPE 29694 (1995).

J.E. Friedhiem ,et al., "Second Generation Synthetic-Based Fluids in the North Sea: Are They Better?", 215-226, IADC/SPE 350061 (1996).

M.A. Legendre Zevallos, et al., "Synthetic Based Fluids Enhanced Environmental and Drilling Performance in Deepwater Locations", 235-242, SPE 35329 (1996).

L. Bailey, et al., "Filtercake Integrity and Reservoir Damage", 111-120, SPE 39429 (1998).

P.A. Bern, et al., "Barite Sag: Measurement , Modeling and Management", IADC/SPE 47784 (1998).

N. Hands, et al., "Optimism Inflow Performence of a Long Multi-Lateral Offshore Permeability Gas Bearing Sandstone: K 14-FB 102 Case Study", 50394 (1998).

L. Xiao, et al., Studies on the Damage Induced by Drilling Fluids in Limestone Cores, SPE 50711 (17 pages) 1999.

A. Meinhold, "Framework for a Comparative Environmental Assessment of Drilling Fluids Used Offshore", SPE 52746 (10 pages) 1999.

L.J Fraser, et al., "Formation-Damaging Characteristics of Mixed Metal Hydroxide Dril-In Fluids and a Comparison with Polymer-Based Fluids", SPE57714 (1999).

A.Saasen, et al., "Prediction of Barite Sag Potential of Drilling Fluids from Rheological Measurements", SPE/IADC 29410 (Feb. 26-Mar. 2, 1995).

P. I Reid, et al., "Field Evaluation of a Novel Inhibitive Water-Based Fluid for Tertiary Shales", SPE 24979 (Nov. 16-18, 1992).

White, et al., "Better Practices and Synthetic Fluid Improve Drilling Rates", Oil & Gas J. Online ( Feb. 20, 1995).

N. Hands, et al., "Drill-in Fluid Reduces Formation Damage, Increases Production Rates", Oil & Gas J. Online (1992).

J. P. Plank, "Wtaer-Based Muds Using Synthetic Polymers Developed for High Temperature Drilling", Oil & GasJ. Online (1998).

Brookfield Instruction Manual for SSV Vane Spindle Set.

Brookfield Press Release on Vane Spindles ( Mar. 12, 2002) ThomasNet Product News Room.

Environmental Impact of Synthetic-Baseed Drilling Fluids, US Dept. of the Interior, Minerals Management Service, Aug. 2000.

EPA Developement Document for Proposed Effluent Limitation Guidelines for Standards for Synthetic-Based Drilling Fluids and Other Non-Aqueous Drilling Fluids. Feb. 1999.

"Horizontal Wells Offer Economic Advantage", Horizontal News, Fall, 1996.

A. Saasen, et al., "Monitoring of Barite Sag in Deviant Drilling", Oil & Gas J. Online (1991).

Novadril (TM) System, MI Technology Report (1993).

G. Robinson, et al. Novel Viscometer for Improved Drilling Fluid Characterization, Baker Hughes INTEQ (1996).

N.J. Alderman,et al., "Vane Rheometry of Bentonite Gels," 39 J. Non-Newtonian Fluid Mechanics 291-310 (1991).

API Recommended Practice Standard Procedure for Field Testing Oil-Based Drilling Fluids, API Rec. Prac. 13B-2, 3rd ed. (Feb. 1998) American Petroleum Institute.

Deposition Transcript of David Carbajal, Co-Inventor of US 6,887,832 in Civil Action 6:05 cv 155, US Dist. Ct. (E. D. TX) *Halliburton Energy Serv.* v *M-I, LLC* (Jan. 12, 2006).

Deposition Transcript of Kimberly Burrows, Co-Inventor of US 6,887,832 in Civil Action 6:05 cv 155, US Dist. Ct. (E. D. TX) *Halliburton Energy Serv.* v *M-I, LLC* (Oct. 26, 2006).

Deposition Transcript of Don Siems, Co-Inventor of US 6,887,832 in Civil Action 6:05 cv 155, US Dist. Ct. (E. D. TX) *Halliburton Energy Serv.* v *M-I, LLC* (Jan. 12, 2006).

Deposition Transcript of Jeff Kirsner, Co-Inventor of US 6,887,832 in Civil Action 6:05 cv 155, US Dist. Ct. (E. D. TX) *Halliburton Energy Serv.* v *M-I, LLC* , (Feb. 15, 2006).

Deposition Transcript of Karen Tripp, Prosecuting Atty. US 6,887,832 in Civil Action 6:05 cv 155, US Dist. Ct. (E. D. TX) *Halliburton Energy Serv.* v *M-I, LLC* , (Jan. 26, 2006).

First Ammended Complaint, Civil Action No. 6:05 cv 155, U.S. District Court, Eastern Dist. of Texas, Tyler Div., *Halliburton Energy Serv.* v *M-I, LLC*, filed Jan. 27, 2006.

M-I, LLC's 2nd Amended Answer, Civil Action No. 6:05 cv 155, US Dist. Court, Eastern Dist. of Texas, *Halliburton Energy Serv.* v *M-I, LLC.* Tyler Div. Filed Feb. 10, 2006.

Plaintiff's Preliminary Infringement Contentions, Civil Action No. 6:05 cv 155, US Dist. Court, Eastern Dist. of Texas, *Halliburton Energy Serv.* v *M-I, LLC.* Filed Sep. 16, 2005.

K. Burrows, et al., "New Low Viscosity Ester is Suitable for Drilling Fluids in Deepwater Applications", SPE 66553, Feb. 2001 (14 pages).

L.F. Nicora, "High-Density Invert-Emulsion System with Very Low Solids Content to Drill ERD and HPHT Wells", SPE 65000, Feb. 2001 (17 pages).

D. Eckhout, et al., "Developement Process and Filed Applications of s New Ester- Based Mud System for ERD Wells on Australia's Northwest Shelf," IADC/SPE 62791 (Sep. 2002).

M.Mas,et al., "A new High-Temperature Oil-Based Drilling Fluid," SPE 53941, Venezuela, Apr. 1999 (14 pages).

C. Cameron, et al. "Drilling Fluids Design and Management for Extended Reach Drilling," IADC/SPE 72290, Oct. 2001 (7 pages).

L. Knox, et al., "New Developements in Ester-Based Mud technology", AADE-02-DFWM-HO-41, Apr. 2002 (9 Pages).

L.J. Fraser, "Field Application of the All-Oil Drilling Fluid," IADC/SPE, Feb. 27-Mar. 2, 2002.

Halliburton's Proposed Terms and Claim Elements for Construction, cv 6:05cv155, US Dist. Ct. (ED TX), *Halliburton Energy Services* v *M-I, LLC* Nov. 21, 2005.

Defendant M-I, LLC's list of Disputed Claim Terms, cv 6:05cv155, US Dist. Ct. (ED TX), *Halliburton Energy Services* v *M-I, LLC* Nov. 21, 2005.

Plaintiff's Preliminary Claim Construction Pursuant to Local Rule 4-2, No. 6:05cv155, US Dist. Ct. (ED TX), *Halliburton Energy Services* v *M-I, LLC* Dec. 23, 2005.

Joint Claim Construction and Prehearing Statement Pursuant to P.R. 4-3, cv 6:05cv155, US Dist. Ct. (ED TX),*Halliburton Energy Serv.* v *M-I, LLC* Jan. 2006.

M-I, LLC's Motion for Leave to Add Inequitable Conduct Defense to it's Pleadings, 6:05cv155, US Dist. Ct. (ED TX). *Halliburton Energy Serv.* v *M-I, LLC* Jan. 2006.

Plaintiff's Initial Disclosures, CV6:05cv155, US Dist. Ct. (ED TX). *Halliburton Energy Serv.* v *M-I, LLC* Sep. 16, 2005.

Defendant M-I, LLc's Initial Disclosures, cv 6:05cv155, US Dist. Ct. (E.D. TX), *Halliburton Energy Serv.* V *M-I, LLC*, Aug. 19, 2005.

Plaintiff Halliburton's Objections and Responses to Defendant M-I, LLC's First Set of Request for Production, cv 6:05cv155, *Halliburton* v. *M-I* Aug. 26, 2005.

Plaintiff Halliburton's Objections and Responses to Defendant M-I, LLC's First Set of Interrogatories, cv 6:05cv155, *Halliburton* v. *M-I* Aug. 26, 2005.

Plaintiff Halliburton's Supplemental Responses and Objections to Defendnant M-I, LLC's First Set of Interrogatories, CV 6:05cv155, *Halliburton*v *M-I, LLC* Oct. 25, 2005.

M-I, LLC's Responses to Plaintiff's First Set of Interrogatories to Defendnant (Nos. 1-21) CV 6:05cv155, US Dist.Ct. (ED TX), *Halliburton* v *M-I* Nov. 16, 2005.

Baroid Drilling Fluids Product Information Sheet on RM-63, Rheology Modifier (1990) (2 pages).

Transcript of Markman Hearing Proceedings in *Halliburton* v *M-I*, 6:05cv155, U S District Ct. Eastern District of Texas, May 12, 2006.

Wood, et al., "Synthetics Reduce Trouble Time in Ultra-Deep Borehole", Offshore, Mar. 1998, pp. 85, 86, 141.

JA Toups, Jr., Westport Technology Center International, Report of Fann 70 Testing of Nine OBM Drilling Fluid Samples from M-I, Inteq, and Baroid for BP Amoco, Aug. 2001.

M-I Internal Lab Test Report Memorandum to Jim Friedheim from John Lee on Pilot Test of SBM from Crosby, Report # RD000426-JL001, Apr. 26, 2000 (1 page).

Complaint (with Cert. of Serv.)—*M-I, LLC* v. *Halliburton Energy Services, Inc.*, CV 07-01078, U.S. Dist. Ct., C.D. Cal., with Exh. A-E.

Protest by M-I, LLC in U.S. Appl. No. 11/634,008 of Jeff Kirsner, et al.

European Office Action (with Attached International Preliminary Examination Report) for EP 03732726.9-2111 dated Jul. 13, 2006 related to US 6,887,832.

Australian Office Action for AU 03732726.9-2111 related to U.S. Appl. No. 10/432,786.

Plaintiff-Appellant Halliburton's Petition for Panel Rehearing and Rehearing En Banc, *Halliburton* v. *M-I*, Appeal 2007-1149, Federal Circuit, filed Feb. 22, 2008, with addendum.

U.S. Court of Appeals for the Federal Circuit opinion of Jan. 25, 2008 in *Halliburton Energy Services, Inc.* v. *M-I, LLC*, 2007-1149, re US Patent No. 6,887,832 (21 pages).

Australian Office Action for AU 2001226086 related to U.S. Appl. No. 10/432,787.

Australian Office Action for AU 2001226085 related to U.S. Appl. No. 10/432,786.

Original Complaint filed Oct. 9, 2007 in U.S. Dist. Ct. for Eastern Dist. TX, Tyler Div., styled *Halliburton Energy Services, Inc.* v. *M-I, LLC*, Civ. Action 6:08-cv-469.

M.D. Green, et al., "An Integrated Solution of Extended-Reach Drilling Problems in teh Niakuk Field, Alaska: Part II-Hydraulics, Cuttings Transport & PWD," SPE 56564, Oct. 3, 1999.

W.W. White, et al., "Downhole Measuremetns of Synthetic-Based Drilling Fluid in an Offshore Well Quantity Dynamic Pressure & Temp. Distributions," SPE D&C, Sep. 1997, pp. 149-157.

Office Action mailed Oct. 26, 2007 in U.S. Appl. No. 10/432,786 of Heinz Mueller.

Office Action mailed Oct. 19, 2007 in U.S. Appl. No. 10/656,684 of Jeff Miller.

Office Action mailed Oct. 11, 2007 in U.S. Appl. No. 10/292,124 of Jeff Kirsner.

Office Action mailed Nov. 20, 2007 in U.S. Appl. No. 11/633,822 of Jeff Kirsner.

Juan Carlos Rojas, et al., "New Constant-Rheology Synthetic-Based Fluid Reduces Downhole Losses in Deepwater Environments," SPE 109586, Nov. 11-14, 2007, 9pp.

MI Swaco Customer Presentation Slides on Rheliant fluid system, pp. HALO-011012-HALO-011080, presented in 2004.

Kim Burrows, et al., Benchmark Performance: Zero Barite Sag and Significantly Reduced Downhole Losses with the Industry's First Clay-Free SBM, IADC/SPE 87138, Mar. 2-4, 2004, 8pp.

Juan Carlos Rojas, et al., "Increased Deepwater Drilling Performance Using Constant Rheology Synthetic-based Mud," AADE-07-NTCE-20, Apr. 10-12, 2007, 9pp.

A. Saasen, "The Effect of Drilling Fluid Rheological Properties on Hole Cleaning," IADC/SPE 74558, Feb. 26-28, 2002, 5 pp.

J.C. Rojas, et.a., "Minimizing Down Hole Mud Losses," IADC/SPE 39398, Mar. 3-6, 1998, 7 pp.

P. Kenny, et al., "The Development and Field Testing of a Less Hazardous and Technically Superior Oil Based Drilling Fliud," SPE 35952, Jun. 9-12, 1996, 9 pp.

Tom Carlson, et al., "Meeting the Challenges of Deepwater Gulf of Mexico Drilling with Non-Petroleum Ester-Based Drilling Fluids," SPE 28739, Oct. 10-19, 1994, 14 pp.

D.E. Jamison, et al., "A New Test Meth. to Characterize Setting/Sag Tend. of Drilling Fluids Used in Extended Reach Drilling," Baroid Drilling Fluids, pp. 109-113, not dated.

Office Action mailed Nov. 20, 2007 in U.S. Appl. No. 11/634,008 of Jeff Kirsner.

May 28, 2004 Letter from Karen B. Tripp to C. Paul Wain (HAL0007177-7180).

Sep. 4, 2004 Amendment and Response to Non-Final Office Action.

Jan. 26, 2006 Deposition Transcript of Karen Tripp, pp. 170-172.

Jan. 12, 2006 Deposition Transcript of David Carbajal, pp. 73-74, 85-86 and 89-90.

Oct. 26, 2005 Deposition Transcript of Kimberly Burrows, pp. 75-76, 81-82 and 225.

Dec. 12, 2005 Deposition Transcript of Donald Siems, pp. 127 and 151-152.

Oct. 18, 2006 Memorandum Opinion and Order, pp. 1-20. (US District Court for the East. Dist. of Texas, Tyler Division. Civil Action No. 6:05-cv-155.

Order of the Federal Circuit denying rehearing and rehearing en banc in 2007-1149 concerning U.S. Patent No. 6,887,832 (2 pages).

Halliburton's Notice of Dismissal (of lawsuit) with Prejudice in U.S. Dist. Ct (Eastern Dist of Tx) Civ. Action No.6:07-cv-469 concerning U.S. Patent No. 7,278,485 (3 pages).

M-I, LLC & Halliburton Agreed Motion to Voluntarily Dismiss U.S. Dist Ct (Eastern Dist of Tx) Civ. Action No. 6:07-CV-311 (2 pages).

Order of the US Dist. Ct for the Eastern District of TX, Tyler, dismissing with prejudice Civ. Action No. 6:07-CV-311 (1 page).

D. Power, et al., "Flat Rheology SBM Shows Promise in Deepwater," May/Jun. 2003 Drilling Contractor, pp. 44-45.

Baroid Drilling Fluids, Res. & Eng. Report No. EMB 5408, Project No. 1559, Test of a Submitted Sample, Jul. 22, 1994, pp. HALO262636-262639.

Baroid Drilling Fluids, Res. & Eng Tech. & Anal. Serv/Support Report No. TS-0858, Det. of Max. Density of a PETROFREE mud, Dec. 12, 1994, pp. HALO262694-262708.

Baroid Drilling Fluids, REs. & Eng. Tech. & Anal. Serv/Support Report No. FS-0058, Field Service Report, Jan. 3, 1997, pp. HALO262709-262725.

Baroid Res. & Eng. Tech. & Analy. Serv/Support Field Support Report No. FS-0080, Dec. 29, 1999, pp. HALO 262769-262770.

VERSATHIN deflocculant Product Bulletin, MI, 2 pages, 1996.

VERSAWET organic surfactant Product Bulletin, MI, 2 pages, 1996.

VERSAMOD organic gelling agent Product Bulletin, MI, 2 pages, 1996.

VERSAPAC rheological additive Product Bulletin, MI, 2 pages, 1999.

VERSALIG amine-treated lignite Product Bulletin, MI, 2 pages, 1997.

VERSALUBE lubricant Product Bulletin, MI, 2 pages, 1999.

NOVAMOD organic gelling agent Product Bulletin, MI, 1 page, not dated.

ADAPTA copolymer Product Data Sheet, Baroid Fluid Services, 1 page, 1996.

RHEMOD L suspension agent/viscosifier Product Data Sheet, Baroid, 1 page, 2001.

RHEMOD L suspension agent/viscosifer agent Product Data Sheet, Baroid Fluids Services, 1 page, 2006.

PCT International Preliminary Examination Report in PCT/US00/35609, corresponding to U.S. Appl. No. 10/432,787, filed Oct. 7, 2004, 3 pp.

PCT International Preliminary Examination Report in PCT/US00/35610, corresponding to U.S. Appl. No. 10/432,786, filed Jul. 8, 2003, 7 pp.

PCT Notification of Transmittal of International Preliminary Examination Report in PCT/US00/35610, corresponding to U.S. Appl. No. 10/432,786, filed Aug. 14, 2003, 4 pp.

PCT International Search Report in PCT/US00/35609, corresponding to U.S. Appl. No. 10/432,786, filed Apr. 12, 2001, 5 pp.

E. van Oort, et al., "Accessing Deep Reservoirs by Drilling Severly Depleted Formation," SPE/ADC 79861, pp. 1-9, SPE/IADC Drilling Conf., Amsterdam, Feb. 19-21, 2003.

T. Wood, et al., "Synthetics Reduct Trouble Time in Ultra-Deepwater Borehole," Mar. 1998 Offshore, pp. 85, 86, 141.

J. Davison, et al, "Rheology of Various Drilling Fluid Systems Under Deepwater Drilling Conditions and . . . " SPE 56632, SPE Ann. Tech, Conf., Houston, Oct. 3-6, 1999, 13 pp.

J. Lee, et al., "A New Approach to Deepwater Drilling Using SMB with Flat Rheology," AADE-04-DF-HO-37, AADE Drilling Fluids Conf., Houston, TX, Apr. 6-7, 2004, 12 pp.

P. Hanson, et al, "Investigation of Barite 'Sag' in Weighted Drilling Fluids in Highly Deviated Wells," SPE 20423, 65th Ann. Conf., New Orleans, Sep. 23-26, 1990, pp. 223-230.

N. Morita, et al., "Theory of Lost Circulation Pressure," SPE 20409, 65th Ann. Tech. Conf., New Orleans, Sep. 23-26, 1990, pp. 44-58.

G. Fuh, et al., "A New Approach to Preventing Lost Circulation While Drilling," SPE 24599, 67th Ann. Tech. Conf., Washington, DC, Oct. 4-7, 1992, pp. 569-582.

E. Onyla, "Experimental Data Analysis of Lost-Circulation Problems During Drilling with Oil-Based Mud," SPE Drilling & Completion, Mar. 1994, pp. 25-31.

M. Zamora, et al., "The Top 10 Mud-Related Concerns in Deepwater Drilling Operations," SPE 59019, Int'l Pet. Conf., Mexico, Feb. 1-3, 2000, 9 pages.

M. Zamora, et al., "Rulesof Thumb to Improve High-Angle Hole Cleaning," Petroluem Engineer Int'l, Jan. 1991, pp. 44, 45, 46, 48, 51.

M. Zamora, et al., "More Ruoles of Thumb to Improve High-Angle Hole Cleaning," Petroleum Engineer Int'l, Feb. 1991, pp. 22, 24, 26, 27.

E. Vik, et al., Factors Affecting Methods for Biodegradation Testing of Drilling Fluids . . . , SPE 35981, Int'l Conf. on Health . . . , New Orleans, Jun. 9-12, 1996, pp. 697-711.

P. Bern, "Barite Sag: Measurement, Modelling and Management," IADC/SPE 47784, Asia Pacific Drilling Conf., Indonesia, Sep. 7-9, 1998, 6 pp.

Halliburton's Opposition to M-I's Motion for Leave to Add Inequitable Conduct Defense to It's Pleadings, 6:05-cv-155, US Dist. Ct. (EDTX), *Halliburton* v. *MI*, Feb. 13, 2006, 232 pp.

Baroid Drilling Fluids, Inc. Product Data Sheets, pp. HALO238976-237636 (1993).

Manual of Drilling Fluids Technology, Fundamental Characteristics of Drilling Fluids, NL Baroid/NL Indus. (1979), pp. HALO237615-237636.

Halliburton Drilling Fluids Technology, Intro. to Drilling, Dril-N & Completion Fluids, Houston Learning Ctr., Dec. 1999, pp. HALO238166-238231.

Baroid's Environmentally Safe Fluids PETROFREE LV, ACCOLADE, not dated, pp. HALO028402-28433.

Notice of Allowance and Fee(s) Due in U.S. Appl. No. 10/432,787, mailed Jul. 1, 2008, 8 pp.

Office Action in U.S. Appl. No. 10/761,552, mailed Apr. 16, 2008, 8 pp.

Office Action in U.S. Appl. No. 10/656,684, mailed Oct. 31, 2008, 7 pp.

Office Action in U.S. Appl. No. 11/825,236, mailed Oct. 9, 2008, 8 pp.

Office Action in U.S. Appl. No. 11/893,195, mailed Oct. 14, 2008, 21 pp.

Notice of Allowance and Issue Fee(s) Due and Notice of Allowability, in U.S. Appl. No. 11/633,822, mailed Aug. 15, 2008, 10 pp.

Notice of Allowance and Issue Fee(s) Due and Notice of Allowability, in U.S. Appl. No. 11/634,008, mailed Sep. 30, 2008, 10 pp.

Office Action in U.S. Appl. No. 10/432,786, mailed Jul. 2, 2008, 14 pp.

Office Action in U.S. Appl. No. 10/633,704, mailed Aug. 18, 2008, 23 pp.

Notice of Allowance and Issue Fee(s) Due and Notice of Allowability, in U.S. Appl. No. 10/292,124, mailed Jul. 29, 2008.

* cited by examiner

INVERT DRILLING FLUIDS AND METHODS OF DRILLING BOREHOLES

RELATED APPLICATIONS

This application is a continuation of U.S. patent application Ser. No. 10/292,124, filed Nov. 12, 2002, now U.S. Pat. No. 7,456,135, which is a continuation-in-part of 10/175,272 filed Jun. 19, 2002 U.S. Pat. No. 6,887,832, issued May 3, 2005, which is a continuation-in-part of U.S. patent application Ser. No. 09/929,465, filed Aug. 14, 2001, abandoned, and International Patent Application Nos. PCT/US00/35609 and PCT/US00/35610, both filed Dec. 29, 2000, and having entered national phase in the United States and pending as U.S. Pat. No. 7,435,706 and pending as U.S. patent application Ser. No. 10/432,786.

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to oil or synthetic fluid based drilling fluids and fluids comprising invert emulsions, such as fluids using esters for example, which combine high ecological compatibility with good stability and performance properties.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic fluid-based muds are normally used to drill swelling or sloughing shales, salt, gypsum, anhydrite or other evaporate formations, hydrogen sulfide-containing formations, and hot (greater than about 300 degrees Fahrenheit ("° F.") holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such oils shall be understood to comprise invert emulsions.

Oil-based muds used in drilling typically comprise: a base oil (or synthetic fluid) comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Such additives commonly include organophilic clays and organophilic lignites. See H. C. H. Darley and George R. Gray, Composition and Properties of Drilling and Completion Fluids 66-67, 561-562 ($5^{th}$ ed. 1988). An oil-based or invert emulsion-based drilling fluid may commonly comprise between about 50:50 to about 95:5 by volume oil phase to water phase. An all oil mud simply comprises 100% liquid phase oil by volume; that is, there is no aqueous internal phase.

Invert emulsion-based muds or drilling fluids (also called invert drilling muds or invert muds or fluids) comprise a key segment of the drilling fluids industry. However, increasingly invert emulsion-based drilling fluids have been subjected to greater environmental restrictions and performance and cost demands. There is consequently an increasing need and industry-wide interest in new drilling fluids that provide improved performance while still affording environmental and economical acceptance.

SUMMARY OF THE INVENTION

The present invention provides improved methods of drilling wellbores in subterranean formations employing oil-based muds, or more particularly, invert emulsion-based muds or drilling fluids. As used herein, the term "drilling" or "drilling wellbores" shall be understood in the broader sense of drilling operations, which include running casing and cementing as well as drilling, unless specifically indicated otherwise. The present invention also provides invert emulsion based drilling fluids for use in the methods of the invention to effect the advantages of the invention.

The methods of the invention comprise using a drilling fluid that is not dependent on organophilic clays (also called "organo-clays") to obtain suspension of drill cuttings or other solids. Rather, the drilling fluid comprises a synergistic combination of an invert emulsion base, thinners, and/or other additives that form a "fragile gel" or show "fragile gel" behavior when used in drilling. The fragile gel structure of the drilling fluid is believed to provide or enable suspension of drill cuttings and other solids.

The fragile gel drilling fluids of the invention, for use in the methods of the invention, are characterized by their performance. When drilling is stopped while using a fluid of the invention, and consequently when the stresses or forces associated with drilling are substantially reduced or removed, the drilling fluid acts as a gel, suspending/continuing to suspend drill cuttings and other solids (such as for example weighting materials) for delivery to the well surface. Nevertheless, when drilling is resumed, the fluid is flowable, acting like a liquid, with no appreciable or noticeable pressure spike as observed by pressure-while-drilling (PWD) equipment or instruments. During drilling, the fluids of the invention generally maintain consistently low values for the difference in their surface density and their equivalent density downhole (ECDs) and show significantly reduced loss when compared to other drilling fluids used in that formation or under comparable conditions. "Sag" problems do not tend to occur with the fluids when drilling deviated wells. The phenomenon of "sag," or "barite sag" is discussed below. Also, the fluids respond quickly to the addition of thinners, with thinning of the fluids occurring soon after the thinners are added, without need for multiple circulations of the fluids with the thinners additive or additives in the wellbore to show the effect of the addition of the thinners. The fluids of the invention also yield flatter profiles between cold water and downhole rheologies, making the fluids advantageous for use in offshore wells. That is, the fluids may be thinned at cold temperatures without causing the fluids to be comparably thinned at higher temperatures.

Laboratory tests may be used to generally identify or distinguish a drilling fluid of the invention. These tests measure elastic modulus and yield point and are generally conducted on laboratory-made fluids having an oil:water ratio of about 70:30. Generally, a fluid of the present invention at these laboratory conditions/specifications will have an elastic modulus ratio of $G'_{10}/G'_{200}$ (as defined herein) greater than about 2. Furthermore, a fluid of the present invention at these laboratory conditions/specifications will have a yield point (measured as described herein) of less than about 3 Pa.

Another test, useful for distinguishing a drilling fluid of the invention using field mud samples, is a performance measure called "Stress Build Function." This measure is an indication of the fragile gel structure building tendencies that are effectively normalized for the initial yield stress (Tau0). The "Stress Build Function" is defined as follows:

$$SBF10\ m=(gel\ strength\ at\ 10\ minutes-Tau0)/Tau0$$

Generally, a field mud of the present invention will have an SBF10 m of greater than about 3.8.

Although the invention is characterized primarily as identifying characteristics or features of an invert emulsion drilling fluid that yield superior performance for use in drilling, certain example compositions also provide significant benefits in terms of environmental acceptance or regulatory compliance. An example of a suitable base is a blend of esters with isomerized or internal olefins ("the ester blend") as described in U.S. patent application Ser. No. 09/929,465, of Jeff Kirsner (co-inventor of the present invention), Kenneth W. Pober and Robert W. Pike, filed Aug. 14, 2001, entitled "Blends of Esters with Isomerized Olefins and Other Hydrocarbons as Base Oils for Invert Emulsion Oil Muds, the entire disclosure of which is incorporated herein by reference. The esters in the blend may be any quantity, but preferably should comprise at least about 10 weight percent to about 99 weight percent of the blend and the olefins should preferably comprise about 1 weight percent to about 99 weight percent of the blend. The esters of the blend are preferably comprised of fatty acids and alcohols and most preferably about $C_6$ to about $C_{14}$ fatty acids and 2-ethyl hexanol. Esters made in ways other than with fatty acids and alcohols, for example, esters made from olefins combined with either fatty acids or alcohols, could also be effective.

Further, such environmentally acceptable examples of invert emulsion drilling fluids have added to or mixed with them other fluids or materials needed to comprise a complete drilling fluid. Such materials may include, for example: additives to reduce or control temperature rheology or to provide thinning, for example, additives having the tradenames COLDTROL®, ATC®, and OMC2™; additives for enhancing viscosity, for example, an additive having the tradename RHEMOD L™; additives for providing temporary increased viscosity for shipping (transport to the well site) and for use in sweeps, for example, an additive having the tradename TEMPERUS™ (modified fatty acid); additives for filtration control, for example, additives having the tradename ADAPTA®; additives for high temperature high pressure control (HTHP) and emulsion stability, for example, additives having the tradename FACTANT™ (highly concentrated tall oil derivative); and additives for emulsification, for example, additives having the tradename LE SUPERMUL™ (polyaminated fatty acid). All of the aforementioned trademarked products are available from Halliburton Energy Services, Inc. in Houston, Tex., U.S.A.

Thinners disclosed in International Patent Application Nos. PCT/US00/35609 and PCT/US00/35610 of Halliburton Energy Services, Inc., Cognis Deutschland GmbH & Co KG., Heinz Muller, Jeff Kirsner (co-inventor of the present invention) and Kimberly Burrows (co-inventor of the present invention), both filed Dec. 29, 2000 and entitled "Thinners for Invert Emulsions," and both disclosures of which are incorporated entirely herein by reference, are particularly useful in the present invention for effecting "selective thinning" of the fluid of the present invention; that is thinning at lower temperatures without rendering the fluid too thin at higher temperatures.

However, as previously noted, preferably no organophilic clays are added to the drilling fluid for use in the invention. Any characterization of the drilling fluid herein as "clayless" shall be understood to mean lacking organophilic clays. Although omission of organophilic clays is a radical departure from traditional teachings respecting preparation of drilling fluids, this omission of organophilic clays in preferred embodiments of the present invention allows the drilling fluid to have greater tolerance to drill solids (i.e., the properties of the fluid are not believed to be readily altered by the drill solids or cuttings) and is believed (without limiting the invention by theory) to contribute to the fluid's superior properties in use as a drilling fluid.

BRIEF DESCRIPTION OF THE DRAWINGS

FIG. 1(a) shows the total downhole losses; FIG. 1(b) shows the barrels lost per barrel of hole drilled; and FIG. 1(c) shows the barrels lost per foot.

DETAILED DESCRIPTION OF PREFERRED EMBODIMENTS

Figure 1A:
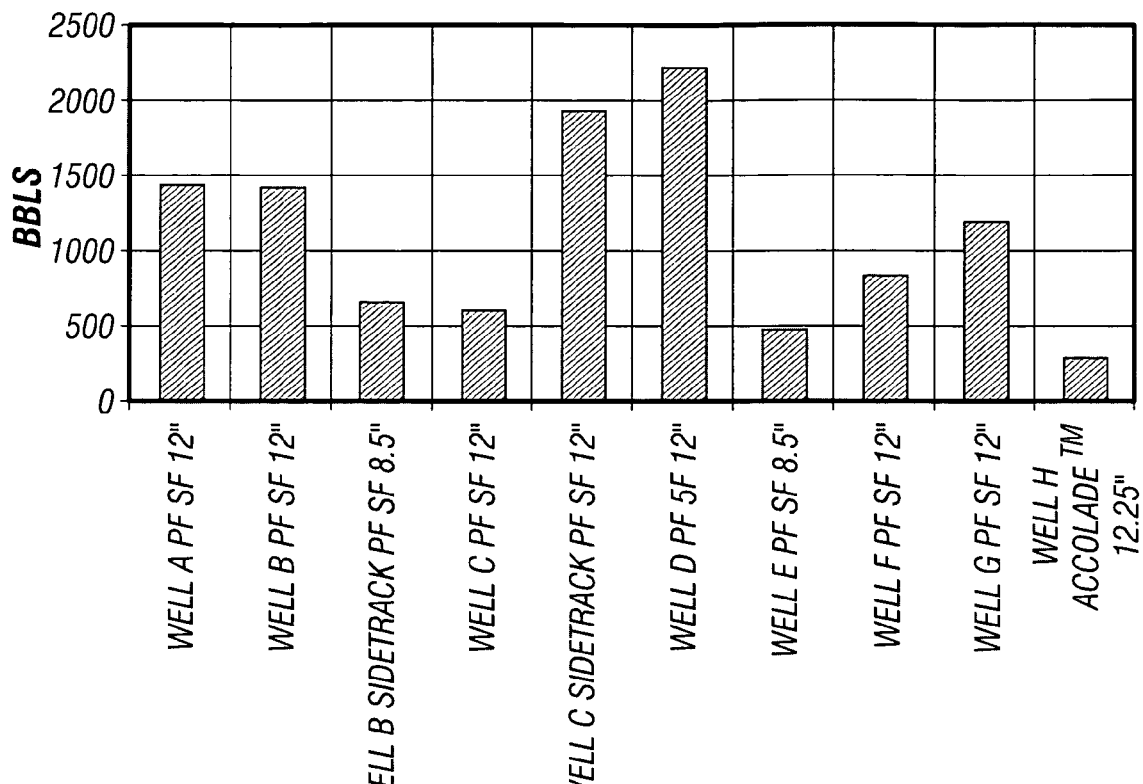
FIGS. 1(a), 1(b) and 1(c) provide three graphs showing field data comparing fluid losses incurred during drilling, running casing and cementing with a prior art isomerized olefin fluid and with a fluid of the present invention.

The present invention provides an invert drilling fluid that meets environmental constraints and provides improved performance in the field. The fluid does not rely on organophilic clays to obtain suspension of barite or drill cuttings, in contrast to other fluids used commercially today. Some of the other characteristics that further distinguish the fluid of the present invention from prior art invert fluids are: (1) lack of noticeable or significant pressure spikes (as detected for example with pressure-while-drilling or PWD equipment or instruments) when resuming pumping after a period of rest during drilling; (2) rapid incorporation of additives while pumping; (3) little or no sag of barite or other solids, including drill cuttings; (4) reduction in fluid losses during drilling; and (5) low ECDs. These characteristics will be further explained and discussed below.

The distinctive characteristics of the fluid of the present invention are believed to be due to a synergistic combination of base oils comprising the fluid. Without limiting the invention by theory, the combination is believed to have the effect of forming a "fragile gel." A "gel" may be defined a number of ways. One definition indicates that a "gel" is a generally colloidal suspension or a mixture of microscopic water particles (and any hydrophilic additives) approximately uniformly dispersed through the oil (and any hydrophobic additives), such that the fluid or gel has a generally homogeneous gelatinous consistency. Another definition states that a "gel" is a colloid in a more solid form than a "sol" and defines a "sol" as a fluid colloidal system, especially one in which the continuous phase is a liquid. Still another definition provides that a "gel" is a colloid in which the disperse phase has combined with the continuous phase to produce a viscous jelly-like product. Generally, a gel has a structure that is continually building. If the yield stress of a fluid increases over time, the fluid has gelled. "Yield stress" is the stress required to be exerted to initiate deformation.

A "fragile gel" as used herein is a "gel" that is easily disrupted or thinned, and that liquifies or becomes less gel-like and more liquid-like under stress, such as caused by moving the fluid, but which quickly returns to a gel or gel-like state when the movement or other stress is alleviated or removed, such as when circulation of the fluid is stopped, as for example when drilling is stopped. The "fragileness" of the "fragile gels" of the present invention contributes to the unique and surprising behavior and advantages of the present invention. The gels are so "fragile" that it is believed that they may be disrupted by a mere pressure wave or a compression wave during drilling. They break instantaneously when disturbed, reversing from a gel back into a liquid form with minimum pressure, force and time and with less pressure, force and time than known to be required to convert prior art fluids from a gel-like state into a flowable state.

In contrast, conventional drilling fluids, using clays to achieve suspension of solids (such as barite and drill cuttings) are believed to have linked or interlinked clay particles providing structure. That is, organo-clays, which are typically formed from montmorillonite treated with a di-alkyl cationic surfactant, swell in non-polar organic solvents, forming open aggregates. This structure, combined with the volume occupied by water droplets is believed to be the main suspending mechanism for barite and other inorganic materials in conventional invert drilling fluids. Mixing additives into the oil/clay suspended system is slower than mixing additives into drilling fluids of the invention.

The drilling fluids of the invention respond quickly to the addition of thinners, with thinning of the fluids occurring soon after the thinners are added, without need for multiple circulations of the fluids with the thinners additive or additives in the wellbore to show the effect of the addition of the thinners. This characteristic provides the drilling operator with the ability to control the fluid rheology "on-the-fly" and "on-command" from the wellbore surface, facilitating control of fluid rheological properties real time. Also, once returned to the surface, the thinner can be used to help separate the solids or drill cuttings from the drilling fluid. This same drilling fluid, after its base fluid has been replenished with requisite additives for fragile gel behavior, can be recycled back into the well for additional drilling. This ability for recycling provides another important advantage of the invention with respect to minimizing disposal costs and environmental issues related to fluid disposal.

The drilling fluids of the invention also yield flatter profiles between cold water and downhole rheologies, making the fluids advantageous for use in deep water wells. That is, the fluids may be thinned at cold temperatures without causing the fluids to be comparably thinned at higher temperatures. As used herein, the terms "deep water" with respect to wells and "higher" and "lower" with respect to temperature are relative terms understood by one skilled in the art of the oil and gas industry. However, generally, as used herein, "deep water wells" refers to any wells at water depths greater than about 1500 feet deep, "higher temperatures" means temperatures over about 120° F. and "lower temperatures" means temperatures at about 40° F. to about 60° F. Rheology of a drilling fluid is typically measured at about 120° F. or about 150° F.

Another distinctive and advantageous characteristic or feature of the drilling fluids of the invention is that sag does not occur or does not significantly occur when the fluids are used in drilling deviated wells. Suspensions of solids in non-vertical columns are known to settle faster than suspensions in vertical ones, due to the "Boycott effect." This effect is driven by gravity and impeded by fluid rheology, particularly non-Newtonian and time dependent rheology. Manifestation of the Boycott effect in a drilling fluid is known as "sag." Sag may also be described as a "significant" variation in mud density (>0.5 to 1 pound per gallon) along the mud column, which is the result of settling of the weighting agent or weight material and other solids in the drilling fluid. Sag can result in formation of a bed of the weighting agent on the low side of the wellbore, and stuck pipe, among other things. In some cases, sag can be very problematic to the drilling operation and in extreme cases may cause hole abandonment.

The fragile gel nature of the invention also contributes to the reduced loss of drilling fluid observed in the field when using the fluid and to the relatively low "ECDs" obtained with the fluid. The difference in a drilling fluid's measured surface density at the well head and the drilling fluid's equivalent circulating density downhole (as typically measured during drilling by downhole pressure-while-drilling (PWD) equipment) is often called "ECD" in the industry. Low "ECDs", that is, a minimal difference in surface and downhole equivalent circulating densities, is critical in drilling deep water wells and other wells where the differences in subterranean formation pore pressures and fracture gradients are small.

Three tests may be used to distinguish drilling fluids of the invention from clay-suspended. (i.e., traditional) fluids. Two of these tests are conducted with laboratory prepared fluids and the third test is conducted with samples of field muds—fluids that have already been used in the field. The two tests with laboratory fluids concern measurement of elastic modulus and yield point and apply to lab-made fluids having a volume ratio of 70/30 oil/water. Generally, drilling fluids of the present invention at these laboratory conditions/specifications will have an elastic modulus ratio of $G'_{10}/G'_{200}$ greater than about 2 and a yield point less than about 3 Pa. These tests are discussed further below using an example drilling fluid of the invention. The example drilling fluid, tradename ACCOLADE™, is available from Halliburton Energy Services, Inc. in Houston, Tex.

Test 1: Ratio of $G'_{10}/G'_{200}$.

Table 1 provides data taken with smooth parallel plate geometry. The elastic modulus (G') was measured using 35 mm parallel plate geometry at a separation of 1 mm on a Haake RS 150 controlled stress rheometer. The applied torque was <1 Pa, inside the linear viscoelastic region for each sample. The elastic modulus was measured after 10 seconds ($G'_{10}$) and after 200 seconds ($G'_{200}$), and the ratio of $G'_{10}/G'_{200}$ is shown in Table 1. All the samples in Table 1 were of drilling fluids having 11.0 pounds per gallon ("ppg" or "lb./gal.") total density and a base oil: water volume ratio of 70:30.

h) zero shear for 600 seconds;
i) steady shear at 3.0 $s^{-1}$ for 60 seconds—take the highest torque reading;
j) zero shear for 600 seconds; and
k) steady shear at 10 $s^{-1}$ for 60 seconds—take the highest torque reading.

The measuring geometry was a 3 mm diameter stainless steel serrated plate, made by Haake with 26 serrations per inch, each serration 0.02 inches deep. As expected the maximum value of the torque to start shearing, as shown in Table 2, increased with shear rate and the value at the lowest shear rate (0.03 $s^{-1}$) was taken as the yield point. All drilling fluids in Table 2 were 11.0 ppg with 70/30 oil/water volume ratio.

TABLE 2

Maximum torque (Pa) at increasing shear rates

| Max $\tau$ (Pa) at a shear rate | ACCOLADE ™ mixed ester/internal olefin | PETRO-FREE® ester | PETRO-FREE® LV low viscosity ester | PETRO-FREE® SF internal-olefin base |
|---|---|---|---|---|
| $\tau$ @ 0.03 $s^{-1}$ | 1.6 | 12.7 | 6.6 | 3.0 |
| $\tau$ @ 0.1 $s^{-1}$ | 2.0 | 13.1 | 7.4 | 4.4 |
| $\tau$ @ 1.0 $s^{-1}$ | 2.7 | 17.8 | 8.7 | 6.6 |

TABLE 1

Ratios of $G'_{10}/G'_{200}$ for various drilling fluids
11.0 ppg Oil: water of 70:30

| | ACCOLADE ™ | INVERMUL® Diesel oil | ENVIROMUL ™ Paraffin oil | PETROFREE® | PETROFREE® SF | PETROFREE® LV |
|---|---|---|---|---|---|---|
| Ratio $G'_{10}/G'_{200}$ | 24 | 1.0 | 0.75 | 1.0 | 1.0 | 1.0 |

Similar data were found for an ACCOLADE™ fluid of 14.0 ppg, for which $G'_{10}/G'_{200}$ was 4.2

Test 2: Yield Points.

The drilling fluids of the invention have an unusually low yield point, measured at low shear rate. The yield point in this test is the torque required to just start a system moving from rest. This point is selected for the measurement because low shear rates remove inertial effects from the measurement and are thus a truer measure of the yield point than measurements taken at other points. The Haake RS 150 rheometer measured the yield point ($\tau$ in units of Pascals, Pa) as the shear rate increased through 0.03, 0.1, 1.0, 3.0 and 10.0 $s^{-1}$. It was found that $\tau$ increased with shear rate, and the value at 0.03 $s^{-1}$ was taken as the true yield point.

The program for measurement was as follows:
a) steady shear at 10 $s^{-1}$ for 30 seconds;
b) zero shear for 600 seconds;
c) steady shear at 0.03 $s^{-1}$ for 60 seconds—take the highest torque reading;
d) zero shear for 600 seconds;
e) steady shear at 0.1 $s^{-1}$ for 60 seconds—take the highest torque reading;
f) zero shear for 600 seconds;
g) steady shear at 1.0 $s^{-1}$ for 60 seconds—take the highest torque reading;

TABLE 2-continued

Maximum torque (Pa) at increasing shear rates

| Max $\tau$ (Pa) at a shear rate | ACCOLADE ™ mixed ester/internal olefin | PETRO-FREE® ester | PETRO-FREE® LV low viscosity ester | PETRO-FREE® SF internal-olefin base |
|---|---|---|---|---|
| $\tau$ @ 3.0 $s^{-1}$ | 2.9 | 19.1 | 9.5 | 7.3 |
| $\tau$ @ 10.0 $s^{-1}$ | 3.3 | 26.4 | 12.0 | 7.5 |

While the ACCOLADE™ fluid or system (example drilling fluid of the invention) was comprised of a mixture of the two tradename PETROFREE® esters and the tradename PETROFREE® SF base oil tested separately, the yield point of the example drilling fluid of the invention was lower than the yield point of any of those individual components or their average. The ACCOLADE™ system's low yield point (1.6 Pa) is a reflection of the "fragile" nature of the ACCOLADE™ system of the invention and contributes to the excellent properties of that fluid of the invention. Further, these test results show a synergistic combination of the base oils to give this low yield point.

Field-based fluids (as opposed to laboratory fluids or muds) may yield varying results in the tests above because of the presence of other fluids, subterranean formation conditions, etc. Generally, experience has shown that the fluids of the invention often tend to yield better results in the field than in the lab. Some field test data will be presented and discussed further below.

Test 3: Stress Build Function.

A test for distinguishing a drilling fluid of the invention using field mud samples is a performance measure called "Stress Build Function." This measure is an indication of the structure building tendencies that are effectively normalized for the initial yield stress (Tau0). This measure also effectively normalizes for mud weight as well, since generally higher weight fluids have higher Tau0 values. The "Stress Build Function" is defined as follows:

$$SBF10\ m = (\text{gel strength at 10 minutes} - Tau0)/Tau0$$

Figure 11:
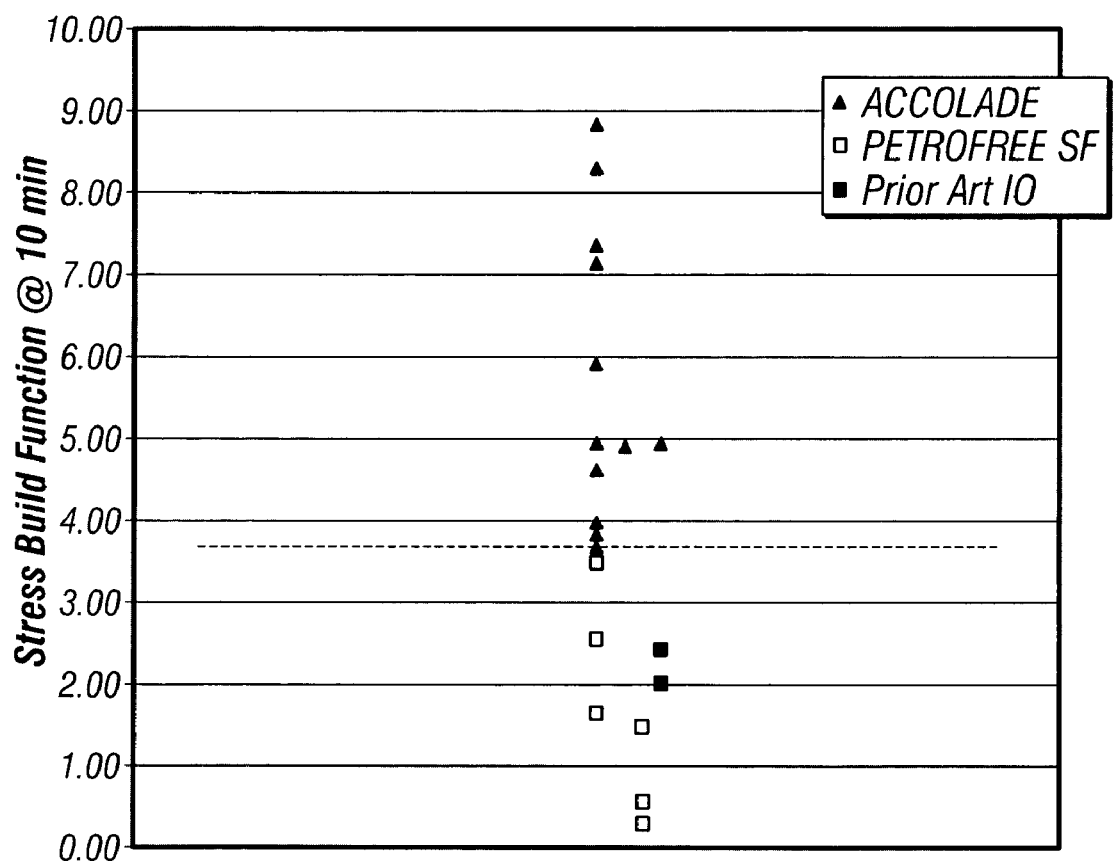
FIG. 11 is a graph showing the Stress Build Function for several prior art field muds compared to the Stress Build Function for a field sample of a fluid of the present invention.

FIG. 11 shows data comparing the Stress Build Function for various field samples of prior art fluids with the Stress Build Function for a field sample of an example fluid of the present invention, ACCOLADE™ system. The prior art fluids included PETROFREE® SF and a prior art internal olefin fluid. All of this data was taken at 120° F. using a FANN® 35, a standard six speed oilfield rheometer. Generally, a field mud of the present invention will have an SBF10 m of greater than about 3.8. Field muds having a SBF10 m as low as about 3.0, however, can provide some advantages of the invention.

While some organo-clay may enter the fluids in the field, for example due to mixing of recycled fluids with the fluids of the invention, the fluids of the invention are tolerant of such clay in quantities less than about 3 pounds per barrel, as demonstrated by the test data shown in Table 3 below. The fluids of the invention, however, behave more like traditional drilling fluids when quantities greater than about 3 pounds per barrel of organo-clays are present. GELTONE® II additive used in the test is a common organo-clay.

TABLE 3

Effects of Addition of Organo-Clays to ACCOLADE ™ System

| Wt (lbs.) of GELTONE ® II additive added/bbl 11.0 ppg ACCOLADE ™ | 0 | 1 | 2 | 3 | 4 |
|---|---|---|---|---|---|
| τ (Pa) at 0.03 s$^{-1}$ | | 1.6 | 2.3 | 2.5 | 4.4 | 4.4 |
| G'$_{10}$/G'$_{200}$ (ratio of G' at 10 s to G' at 200 s) | | 24 | 14 | 10 | 1.0 | 1.0 |

Any drilling fluid that can be formulated to provide "fragile gel" behavior is believed to have the benefits of the present invention. Any drilling fluid that can be formulated to have an elastic modulus ratio of G'$_{10}$/G'$_{200}$ greater than about 2 and/or a yield point measured as described above less than about 3 Pa is believed to have the benefits of the present invention.

While the invert emulsion drilling fluids of the present invention have an invert emulsion base, this base is not limited to a single formulation. Test data discussed herein for an example formulation of an invert emulsion drilling fluid of the invention is for a drilling fluid comprising a blend of one or more esters and one or more isomerized or internal olefins ("ester blend") such as described in U.S. patent application Ser. No. 09/929,465, of Jeff Kirsner (co-inventor of the present invention), Kenneth W. Pober and Robert W. Pike, filed Aug. 14, 2001, entitled "Blends of Esters with Isomerized Olefins and Other Hydrocarbons as Base Oils for Invert Emulsion Oil Muds," the entire disclosure of which is incorporated herein by reference. In such blend, preferably the esters will comprise at least about 10 weight percent of the blend and may comprise up to about 99 weight percent of the blend, although the esters may be used in any quantity. Preferred esters for blending are comprised of about $C_6$ to about $C_{14}$ fatty acids and alcohols, and are particularly or more preferably disclosed in U.S. Pat. No. Re. 36,066, reissued Jan. 25, 1999 as a reissue of U.S. Pat. No. 5,232,910, assigned to Henkel KgaA of Dusseldorf, Germany, and Baroid Limited of London, England, and in U.S. Pat. No. 5,252,554, issued Oct. 12, 1993, and assigned to Henkel Kommanditgesellschaft auf Aktien of Dusseldorf, Germany and Baroid Limited of Aberdeen, Scotland, each disclosure of which is incorporated in its entirety herein by reference. Esters disclosed in U.S. Pat. No. 5,106,516, issued Apr. 21, 1992, and U.S. Pat. No. 5,318,954, issued Jun. 7, 1984, both assigned to Henkel Kommanditgesellschaft auf Aktien, of Dusseldorf, Germany, each disclosure of which is incorporated in its entirety herein by reference, may also (or alternatively) be used. The most preferred esters for use in the invention are comprised of about $C_{12}$ to about $C_{14}$ fatty acids and 2-ethyl hexanol or about $C_8$ fatty acids and 2-ethyl hexanol. These most preferred esters are available commercially under tradenames PETROFREE® and PETROFREE® LV, respectively, from Halliburton Energy Services, Inc. in Houston, Tex. Although esters made with fatty acids and alcohols are preferred, esters made other ways, such as from combining olefins with either fatty acids or alcohols, may also be effective.

Isomerized or internal olefins for blending with the esters for an ester blend may be any such olefins, straight chain, branched, or cyclic, preferably having about 10 to about 30 carbon atoms. Isomerized, or internal, olefins having about 40 to about 70 weight percent $C_{16}$ and about 20 to about 50 weight percent $C_{18}$ are especially preferred. An example of an isomerized olefin for use in an ester blend in the invention that is commercially available is SF BASE™ fluid, available from Halliburton Energy Services, Inc. in Houston, Tex. Alternatively, other hydrocarbons such as paraffins, mineral oils, glyceride triesters, or combinations thereof may be substituted for or added to the olefins in the ester blend. Such other hydrocarbons may comprise from about 1 weight percent to about 99 weight percent of such blend.

Invert emulsion drilling fluids may be prepared comprising SF BASE™ fluid without the ester, however, such fluids are not believed to provide the superior properties of fluids of the invention with the ester. Field data discussed below has demonstrated that the fluids of the invention are superior to prior art isomerized olefin based drilling fluids, and the fluids of the invention have properties especially advantageous in subterranean wells drilled in deep water. Moreover, the principles of the methods of the invention may be used with invert emulsion drilling fluids that form fragile gels or yield fragile gel behavior, provide low ECDs, and have (or seem to have) viscoelasticity that may not be comprised of an ester blend. One example of such a fluid may comprise a polar solvent instead of an ester blend. Diesel oil may be substituted for the ester provided that it is blended with a fluid that maintains the viscosity of that blend near the viscosity of preferred ester blends of the invention such as the ACCOLADE™ system. For example, a polyalphaolefin (PAO), which may be branched or unbranched but is preferably linear and preferably ecologically acceptable (non-polluting oil) blended with diesel oil demonstrates some advantages of the invention at viscosities approximating those of an ACCOLADE™ fluid.

Other examples of possible suitable invert emulsion bases for the drilling fluids of the present invention include isomerized olefins blended with other hydrocarbons such as linear alpha olefins, paraffins, or naphthenes, or combinations thereof ("hydrocarbon blends").

Paraffins for use in blends comprising invert emulsions for drilling fluids for the present invention may be linear, branched, poly-branched, cyclic, or isoparaffins, preferably having about 10 to about 30 carbon atoms. When blended with esters or other hydrocarbons such as isomerized olefins, linear alpha olefins, or naphthenes in the invention, the paraffins should comprise at least about 1 weight percent to about 99 weight percent of the blend, but preferably less than about 50 weight percent. An example of a commercially available paraffin suited for blends useful in the invention is called tradename XP-07™ product, available from Halliburton Energy Services, Inc. in Houston, Tex. XP-07™ is primarily a $C_{12-16}$ linear paraffin.

Examples of glyceride triesters for ester/hydrocarbon blends useful in blends comprising invert emulsions for drilling fluids for the present invention may include without limitation materials such as rapeseed oil, olive oil, canola oil, castor oil, coconut oil, corn oil, cottonseed oil, lard oil, linseed oil, neatsfoot oil, palm oil, peanut oil, perilla oil, rice bran oil, safflower oil, sardine oil, sesame oil, soybean oil, and sunflower oil.

Naphthenes or napthenic hydrocarbons for use in blends comprising invert emulsions for drilling fluids for the present invention may be any saturated, cycloparaffinic compound, composition or material with a chemical formula of $C_nH_{2n}$, where n is a number about 5 to about 30.

In still another embodiment, a hydrocarbon blend might be blended with an ester blend to comprise an invert emulsion base for a drilling fluid of the present invention.

The exact proportions of the components comprising an ester blend (or other blend or base for an invert emulsion) for use in the present invention will vary depending on drilling requirements (and characteristics needed for the blend or base to meet those requirements), supply and availability of the components, cost of the components, and characteristics of the blend or base necessary to meet environmental regulations or environmental acceptance. The manufacture of the various components of the ester blend (or other invert emulsion base) is understood by one skilled in the art.

Further, the invert emulsion drilling fluids of the invention or for use in the present invention have added to them or mixed with their invert emulsion base, other fluids or materials needed to comprise complete drilling fluids. Such materials may include, for example: additives to reduce or control temperature rheology or to provide thinning, for example, additives having the tradenames COLDTROL®, ATC®, and OMC2™; additives for enhancing viscosity, for example, an additive having the tradename RHEMOD L™; additives for providing temporary increased viscosity for shipping (transport to the well site) and for use in sweeps, for example, an additive having the tradename TEMPERUS™ (modified fatty acid); additives for filtration control, for example, an additive having the tradename ADAPTA®; additives for high temperature high pressure control (HTHP) and emulsion stability, for example, an additive having the tradename FACTANT™ (highly concentrated tall oil derivative); and additives for emulsification, for example, an additive having the tradename LE SUPERMUL™ (polyaminated fatty acid). All of the aforementioned trademarked products are available from Halliburton Energy Services, Inc. in Houston, Tex., U.S.A. Additionally, the fluids comprise an aqueous solution containing a water activity lowering compound, composition or material, comprising the internal phase of the invert emulsion. Such solution is preferably a saline solution comprising calcium chloride (typically about 25% to about 30%, depending on the subterranean formation water salinity or activity), although other salts or water activity lowering materials known in the art may alternatively or additionally be used.

Figure 10:
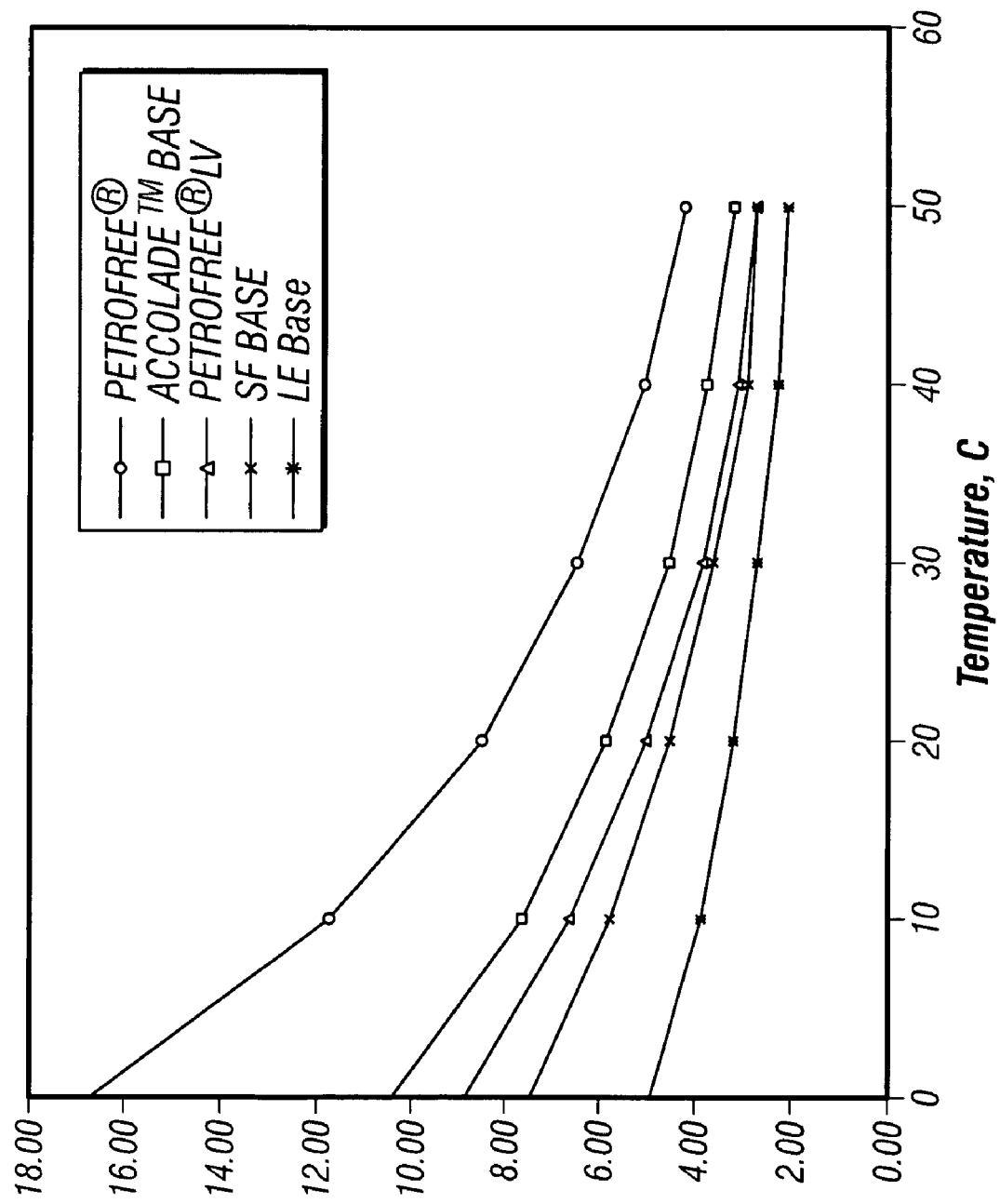
FIG. 10 is a graph comparing the viscosity of various known invert emulsion bases for drilling fluids with the invert emulsion base for a drilling fluid of the present invention.

FIG. 10 compares the viscosity of a base fluid for comprising a drilling fluid of the present invention with known base fluids of some prior art invert emulsion drilling fluids. The base fluid for the drilling fluid of the present invention is one of the thickest or most viscous. Yet, when comprising a drilling fluid of the invention, the drilling fluid has low ECDs, provides good suspension of drill cuttings, satisfactory particle plugging and minimal fluid loss in use. Such surprising advantages of the drilling fluids of the invention are believed to be facilitated in part by a synergy or compatibility of the base fluid with appropriate thinners for the fluid.

Thinners disclosed in International Patent Application Nos. PCT/US00/35609 and PCT/US00/35610 of Halliburton Energy Services, Inc., Cognis Deutschland GmbH & Co KG., Heinz Muller, Jeff Kirsner (co-inventor of the present invention) and Kimberly Burrows (co-inventor of the present invention), both filed Dec. 29, 2000 and entitled "Thinners for Invert Emulsions," and both disclosures of which are incorporated entirely herein by reference, are particularly useful in the present invention for effecting such "selective thinning" of the fluid of the present invention; that is thinning at lower temperatures without rendering the fluid too thin at higher temperatures. Such thinners may have the following general formula: $R-(C_2H_4O)_n(C_3H_6)_m(C_4H_8O)_k-H$ ("formula I"), where R is a saturated or unsaturated, linear or branched alkyl radical having about 8 to about 24 carbon atoms, n is a number ranging from about 1 to about 10, m is a number ranging from about 0 to about 10, and k is a number ranging from about 0 to about 10. Preferably, R has about 8 to about 18 carbon atoms; more preferably, R has about 12 to about 18 carbon atoms; and most preferably, R has about 12 to about 14 carbon atoms. Also, most preferably, R is saturated and linear.

The thinner may be added to the drilling fluid during initial preparation of the fluid or later as the fluid is being used for drilling or well service purposes in the subterranean formation. The quantity of thinner added is an effective amount to maintain or effect the desired viscosity of the drilling fluid. For purposes of this invention, the thinner of formula (I) is preferably from about 0.5 to about 15 pounds per barrel of drilling fluid. A more preferred amount of thinner ranges from about 1 to about 5 pounds per barrel of drilling fluid and a most preferred amount is about 1.5 to about 3 pounds thinner per barrel of drilling fluid.

The compositions or compounds of formula (I) may be prepared by customary techniques of alkoxylation, such as alkoxylating the corresponding fatty alcohols with ethylene oxide and/or propylene oxide or butylene oxide under pressure and in the presence of acidic or alkaline catalysts as is known in the art. Such alkoxylation may take place blockwise, i.e., the fatty alcohol may be reacted first with ethylene oxide, propylene oxide or butylene oxide and subsequently, if desired, with one or more of the other alkylene oxides. Alternatively, such alkoxylation may be conducted randomly, in which case any desired mixture of ethylene oxide, propylene oxide and/or butylene oxide is reacted with the fatty alcohol.

In formula (I), the subscripts n and m respectively represent the number of ethylene oxide (EO) and propylene oxide (PO) molecules or groups in one molecule of the alkoxylated fatty alcohol. The subscript k indicates the number of butylene oxide (BO) molecules or groups. The subscripts n, m, and k need not be integers, since they indicate in each case statistical averages of the alkoxylation. Included without limitation are those compounds of formula (I) whose ethoxy, propoxy, and/or butoxy group distribution is very narrow, for example, "narrow range ethoxylates" also called "NREs" by those skilled in the art.

The compound of formula (I) should contain at least one ethoxy group. Preferably, the compound of formula I will also contain at least one propoxy group ($C_3H_6O$—) or butoxy group ($C_4H_8O$—). Mixed alkoxides containing all three alkoxide groups—ethylene oxide, propylene oxide, and butylene oxide—are possible for the invention but are not preferred.

Preferably, for use according to this invention, the compound of formula (I) will have a value for m ranging from about 1 to about 10 with k zero or a value for k ranging from about 1 to about 10 with m zero. Most preferably, m will be about 1 to about 10 and k will be zero.

Alternatively, such thinners may be a non-ionic surfactant which is a reaction product of ethylene oxide, propylene oxide and/or butylene oxide with $C_{10-22}$ carboxylic acids or $C_{10-22}$ carboxylic acid derivatives containing at least one double bond in position 9/10 and/or 13/14. These thinners may be used alone (without other thinners) or may be used in combination with a formula (I) thinner or with one or more commercially available thinners, including for example, products having the tradenames COLDTROL® (alcohol derivative), OMC2™ (oligomeric fatty acid), and ATC® (modified fatty acid ester), which themselves may be used alone as well as in combination, and are available from Halliburton Energy Services, Inc. in Houston, Tex., U.S.A. Blends of thinners such as the OMC2™, COLDTROL®, and ATC® thinners can be more effective in fluids of the invention than a single one of these thinners.

The formulations of the fluids of the invention, and also the formulations of the prior art isomerized olefin based drilling fluids, used in drilling the boreholes cited in the field data below, vary with the particular requirements of the subterranean formation. Table 4 below, however, provides example formulations and properties for these two types of fluids discussed in the field data below. All trademarked products in Table 4 are available from Halliburton Energy Services, Inc. in Houston, Tex., including: LE MUL™ emulsion stabilizer (a blend of oxidized tall oil and polyaminated fatty acid); LE SUPERMUL™ emulsifier (polyaminated fatty acid); DURATONE® HT filtration control agent (organophilic leonardite); ADAPTA® filtration control agent (copolymer particularly suited for providing HPHT filtration control in non-aqueous fluid systems); RHEMOD L™ suspension agent/viscosifier (modified fatty acid); GELTONE® II viscosifier (organophilic clay); VIS-PLUS® suspension agent (carboxylic acid); BAROID® weighting agent (ground barium sulfate); and DEEP-TREAT® wetting agent/thinner (sulfonate sodium salt). In determining the properties in Table 4, samples of the fluids were sheared in a Silverson commercial blender at 7,000 rpm for 10 minutes, rolled at 150° F. for 16 hours, and stirred for 10 minutes. Measurements were, taken with the fluids at 120° F., except where indicated otherwise.

TABLE 4

| | ACCOLADE™ System | Isomerized Olefin Based Invert Emulsion Drilling Fluid |
|---|---|---|
| A. Example Formulations | | |
| Fluids and Compounds | | |
| ACCOLADE™ Base (bbl) | 0.590 | — |
| SF BASE™ (bbl) | — | 0.568 |
| LE MUL™[1] (lb.) | — | 4 |
| LE SUPERMUL™[2] (lb.) | 10 | 6 |
| Lime (lb.) | 1 | 4 |
| DURATONE® HT[3] (lb.) | — | 4 |
| Freshwater (bbl) | 0.263 | 0.254 |
| ADAPTA®[4] (lb.) | 2 | — |
| RHEMOD L™[5] (lb.) | 1 | — |
| GELTONE® II[6] (lb.) | — | 5 |
| VIS-PLUS®[7] (lb.) | — | 1.5 |
| BAROID®[8] (lb.) | 138 | 138 |
| Calcium chloride (lb.) | 32 | 31 |
| DEEP-TREAT®[9] (lb.) | — | 2 |
| B. Properties | | |
| Plastic Viscosity (cP) | 19 | 19 |
| Yield Point (lb/100 ft$^2$) | 13 | 14 |
| 10 second gel (lb/100 ft$^2$) | 9 | 7 |
| 10 minute gel (lb/100 ft$^2$) | 12 | 9 |
| HPHT Temperature (° F.) | 225 | 200 |
| HPHT @ 500 psid (mL) | 0.8 | 1.2 |
| Electrical stability (volts) | 185 | 380 |
| FANN® 35 Dial Readings: | | |
| 600 rpm | 51 | 52 |
| 300 rpm | 32 | 33 |
| 200 rpm | 25 | 26 |
| 100 rpm | 18 | 18 |
| 6 rpm | 7 | 7 |
| 3 rpm | 5 | 6 |

[1] Blend of oxidized tall oil and polyaminated fatty acid emulsion stabilizer.
[2] Polyaminated fatty acid emulsifier.
[3] Organophilic leonardite filtration control agent.
[4] Copolymer HTHP filtration control agent for non-aqueous systems.
[5] Modified fatty acid suspension agent/viscosifier.
[6] Organophilic clay viscosifier.
[7] Carboxylic acid suspension agent.
[8] Ground barium sulfate weighting agent.
[9] Sulfonate sodium salt wetting agent/thinner.

The invert emulsion drilling fluids of the present invention preferably do not have any organophilic clays added to them. The fluids of the invention do not need organophilic clays or organophilic lignites to provide their needed viscosity, suspension characteristics, or filtration control to carry drill cuttings to the well surface. Moreover, the lack of appreciable amounts of organophilic clays and organophilic lignites in the fluids is believed to enhance the tolerance of the fluids to the drill cuttings. That is, the lack of appreciable amounts of organophilic clays and organophilic lignites in the fluids of the invention is believed to enable the fluids to suspend and carry drill cuttings without significant change in the fluids' Theological properties.

Experimental

The present invention provides a drilling fluid with a relatively flat rheological profile. Table 5 provides example Theological data for a drilling fluid of the invention comprising 14.6 ppg of a tradename ACCOLADE™ system.

TABLE 5

ACCOLADE ™ System Downhole Properties
FANN ® 75 Rheology
14.6 ppg ACCOLADE ™ System

| Temp. (° F.) | 120 | 40 | 40 | 40 | 80 | 210 | 230 | 250 | 270 |
|---|---|---|---|---|---|---|---|---|---|
| Pressure | 0 | 0 | 3400 | 6400 | 8350 | 15467 | 16466 | 17541 | 18588 |
| 600 rpm | 67 | 171 | 265 | 325 | 202 | 106 | 98 | 89 | 82 |
| 300 rpm | 39 | 90 | 148 | 185 | 114 | 63 | 58 | 52 | 48 |
| 200 rpm | 30 | 64 | 107 | 133 | 80 | 49 | 45 | 40 | 37 |
| 100 rpm | 19 | 39 | 64 | 78 | 47 | 32 | 30 | 27 | 25 |
| 6 rpm | 6 | 6 | 10 | 11 | 11 | 8 | 9 | 8 | 8 |
| 3 rpm | 5 | 6 | 10 | 11 | 11 | 8 | 9 | 8 | 8 |
| Plastic Viscosity (cP) | 28 | 81 | 117 | 140 | 88 | 43 | 40 | 37 | 34 |
| Yield Point (lb/100 ft$^2$) | 11 | 9 | 31 | 45 | 26 | 20 | 18 | 15 | 14 |
| N | 0.837 | 0.948 | 0.869 | 0.845 | 0.906 | 0.799 | 0.822 | 0.855 | 0.854 |
| K | 0.198 | 0.245 | 0.656 | 0.945 | 0.383 | 0.407 | 0.317 | 0.226 | 0.21 |
| Tau 0 (lb/100 ft$^2$ | 4.68 | 6.07 | 8.29 | 8.12 | 9.68 | 7.45 | 8.21 | 8.29 | 7.75 |

As used in Table 5, "N" and "K" are Power Law model rheology parameters.

Figure 9A:
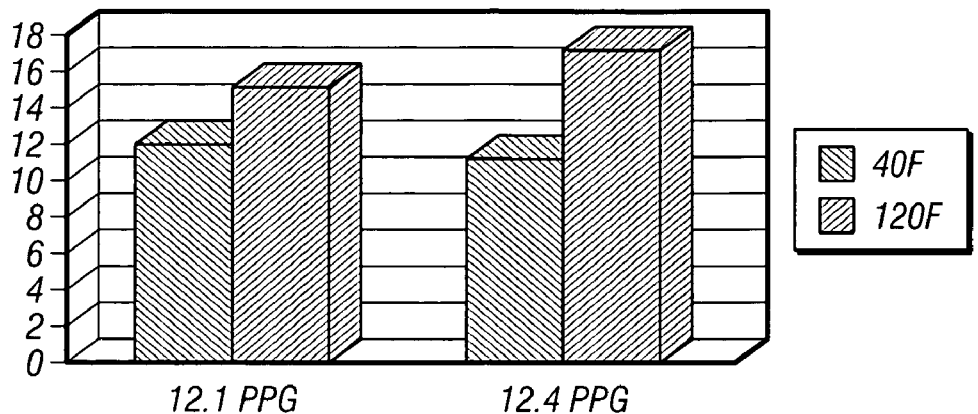
FIG. 9(a) is a bar graph comparing the yield point of two densities of a fluid of the invention at standard testing temperatures of 40° F. and 120° F.
Figure 9B:
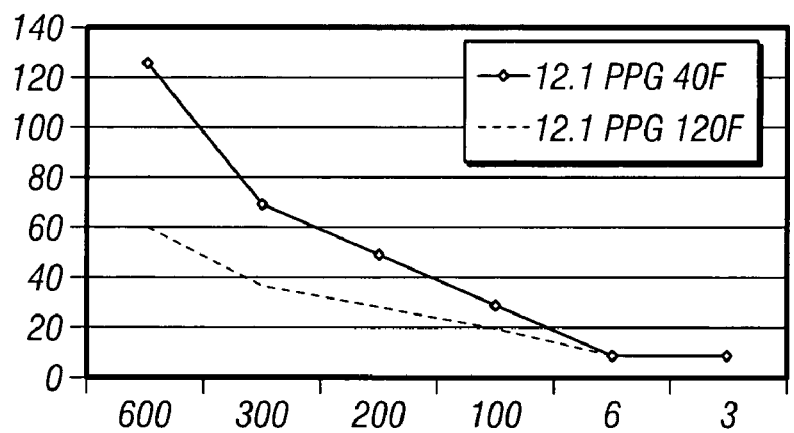
FIGS. 9(b) and (c) are graphs of the FANN® 35 instrument dial readings for these same two densities of a fluid of the invention over a range of shear rates at standard testing temperatures of 40° F. and 120° F.
Figure 9C:
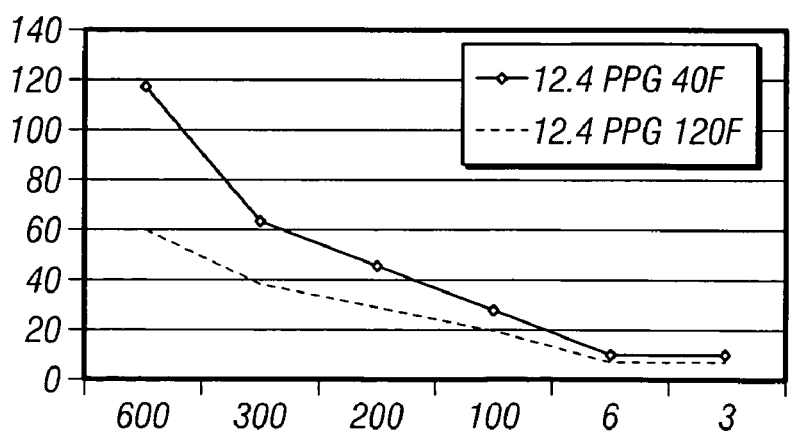

FIGS. 9(b) and (c) compare the effect of temperature on pressures observed with two different fluid weights (12.1 and 12.4 ppg) when applying six different and increasing shear rates (3, 6, 100, 200, 300, and 600 rpm). Two common testing temperatures were used—40° F. and 120° F. The change in temperature and fluid weight resulted in minimal change in fluid behavior. FIG. 9(a) compares the yield point of two different weight formulations (12.1 ppg and 12.4 ppg) of a fluid of the present invention at two different temperatures (40° F. and 120° F.). The yield point is unexpectedly lower at 40° F. than at 120° F. Prior art oil-based fluids typically have lower yield points at higher temperatures, as traditional or prior art oils tend to thin or have reduced viscosity as temperatures increase. In contrast, the fluids of the invention can be thinned at lower temperatures without significantly affecting the viscosity of the fluids at higher temperatures. This feature or characteristic of the invention is a further indicator that the invention will provide good performance as a drilling fluid and will provide low ECDs. Moreover, this characteristic indicates the ability of the fluid to maintain viscosity at higher temperatures. The preferred temperature range for use of an ACCOLADE™ system extends from about 40° F. to about 350° F. The preferred mud weight for an ACCOLADE™ system extends from about 9 ppg to about 17 ppg.

Field Tests

The present invention has been tested in the field and the field data demonstrates the advantageous performance of the fluid compositions of the invention and the methods of using them. As illustrated in FIGS. 1(a), (b), (c), and 2, the present invention provides an invert emulsion drilling fluid that may be used in drilling boreholes or wellbores in subterranean formations, and in other drilling operations in such formations (such as in casing and cementing wells), without significant loss of drilling fluid when compared to drilling operations with prior art fluids.

Figure 1B:
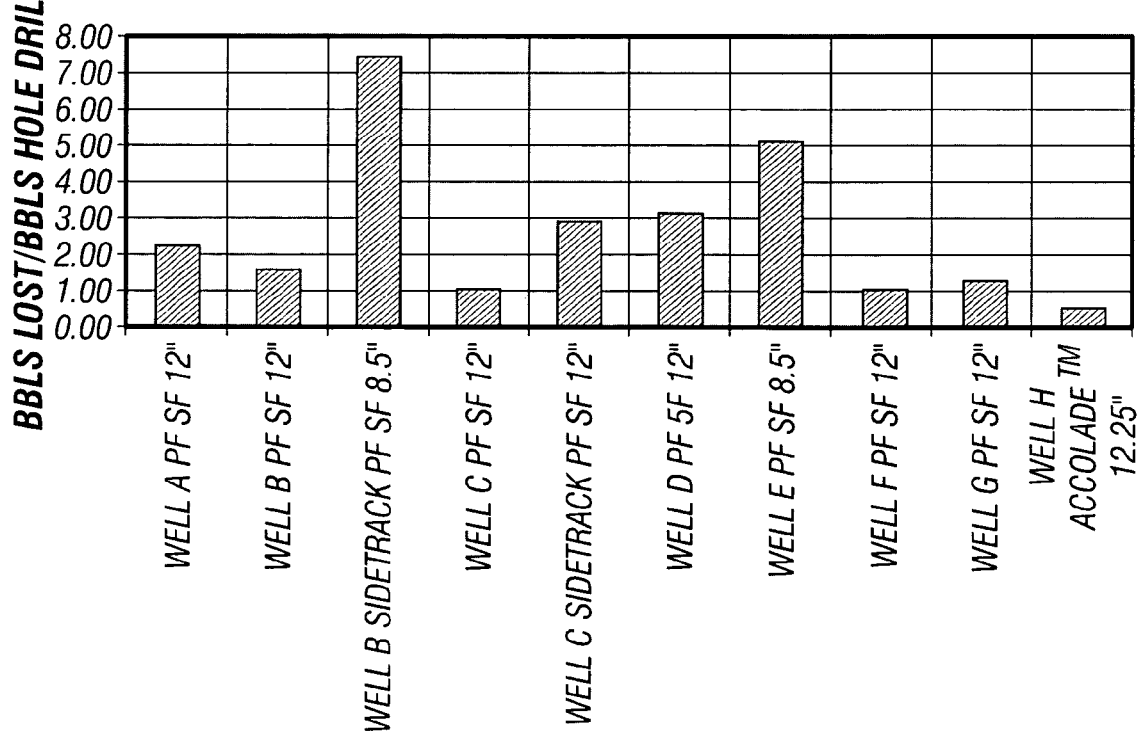
Figure 1C:
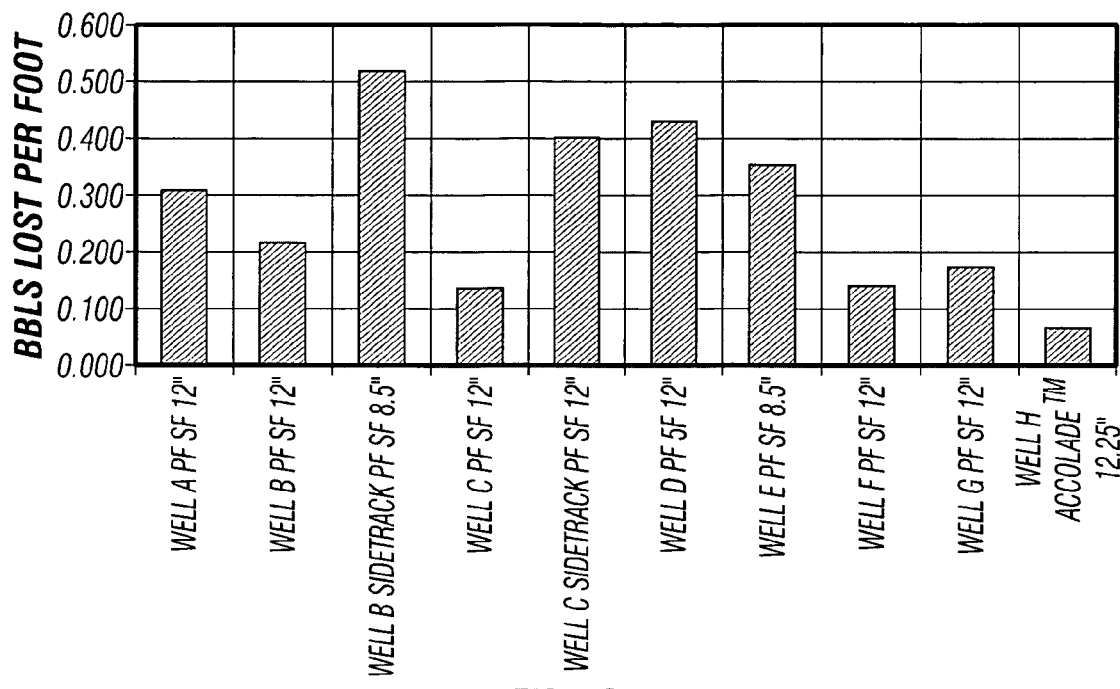

FIGS. 1(a), (b), and (c) show three graphs comparing the actual fluid loss experienced in drilling 10 wells in the same subterranean formation. In nine of the wells, an isomerized olefin based fluid (in this case, tradename PETROFREE® SF available from Halliburton Energy Services, Inc. in Houston, Tex.), viewed as an industry "standard" for full compliance with current environmental regulations, was used. In one well, a tradename ACCOLADE™ system, a fluid having the features or characteristics of the invention and commercially available from Halliburton Energy Services, Inc. in Houston, Tex. (and also fully complying with current environmental regulations) was used. The hole drilled with an ACCOLADE™ system was 12.25 inches in diameter. The holes drilled with the "standard" tradename PETROFREE® SF fluid were about 12 inches in diameter with the exception of two sidetrack holes that were about 8.5 inches in diameter. FIG. 1(a) shows the total number of barrels of fluid lost in drilling, running, casing and cementing the holes. FIG. 1(b) shows the total number of barrels of fluid lost per barrel of hole drilled. FIG. 1(c) shows the total number of barrels of fluid lost per foot of well drilled, cased or cemented. For each of these wells graphed in these FIGS. 1(a), (b) and (c), the drilling fluid lost when using a fluid of the invention was remarkably lower than when using the prior art fluid.

Figure 2:
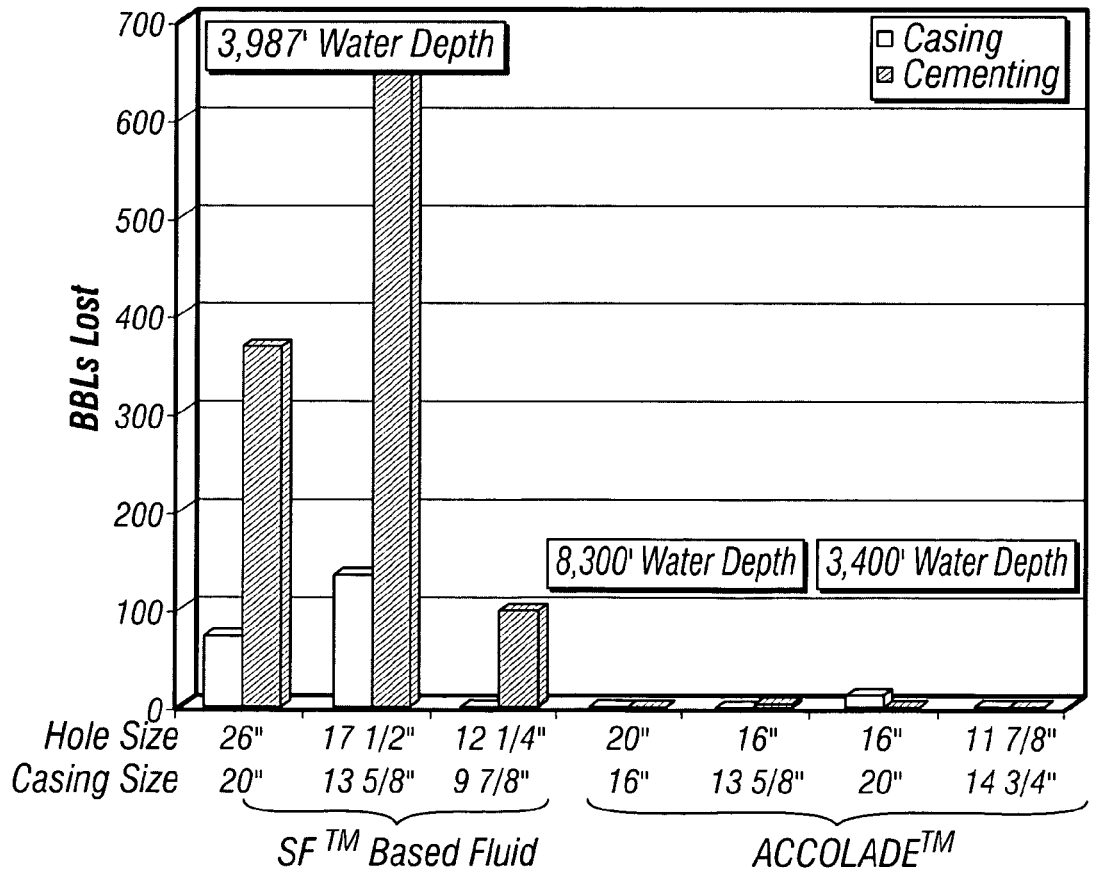
FIG. 2 is a graph comparing fluid loss incurred running casing and cementing in seven boreholes at various depths, where the fluid used in the first three holes was a prior art isomerized olefin fluid and the fluid used in the last four holes was a fluid of the present invention.

FIG. 2 compares the loss of fluid with the two drilling fluids in running casing and cementing at different well depths in the same subterranean formation. The prior art isomerized olefin based fluid was used in the first three wells shown on the bar chart and a fluid of the present invention was used in the next four wells shown on the bar chart. Again, the reduction in loss of fluid when using the fluid of the present invention was remarkable.

The significant reduction in fluid loss seen with the present invention is believed to be due at least in substantial part to the "fragile gel" behavior of the fluid of the present invention and to the chemical structure of the fluid that contributes to, causes, or results in that fragile gel behavior. According to the present invention, fluids having fragile gel behavior provide significant reduction in fluid losses during drilling (and casing and cementing) operations when compared to fluid losses incurred with other drilling fluids that do not have fragile gel behavior. Thus, according to the methods of the invention, drilling fluid loss may be reduced by employing a drilling fluid in drilling operations that is formulated to comprise fragile gels or to exhibit fragile gel behavior. As used herein, the term "drilling operations" shall mean drilling, running casing and/or cementing unless indicated otherwise.

Figure 3:
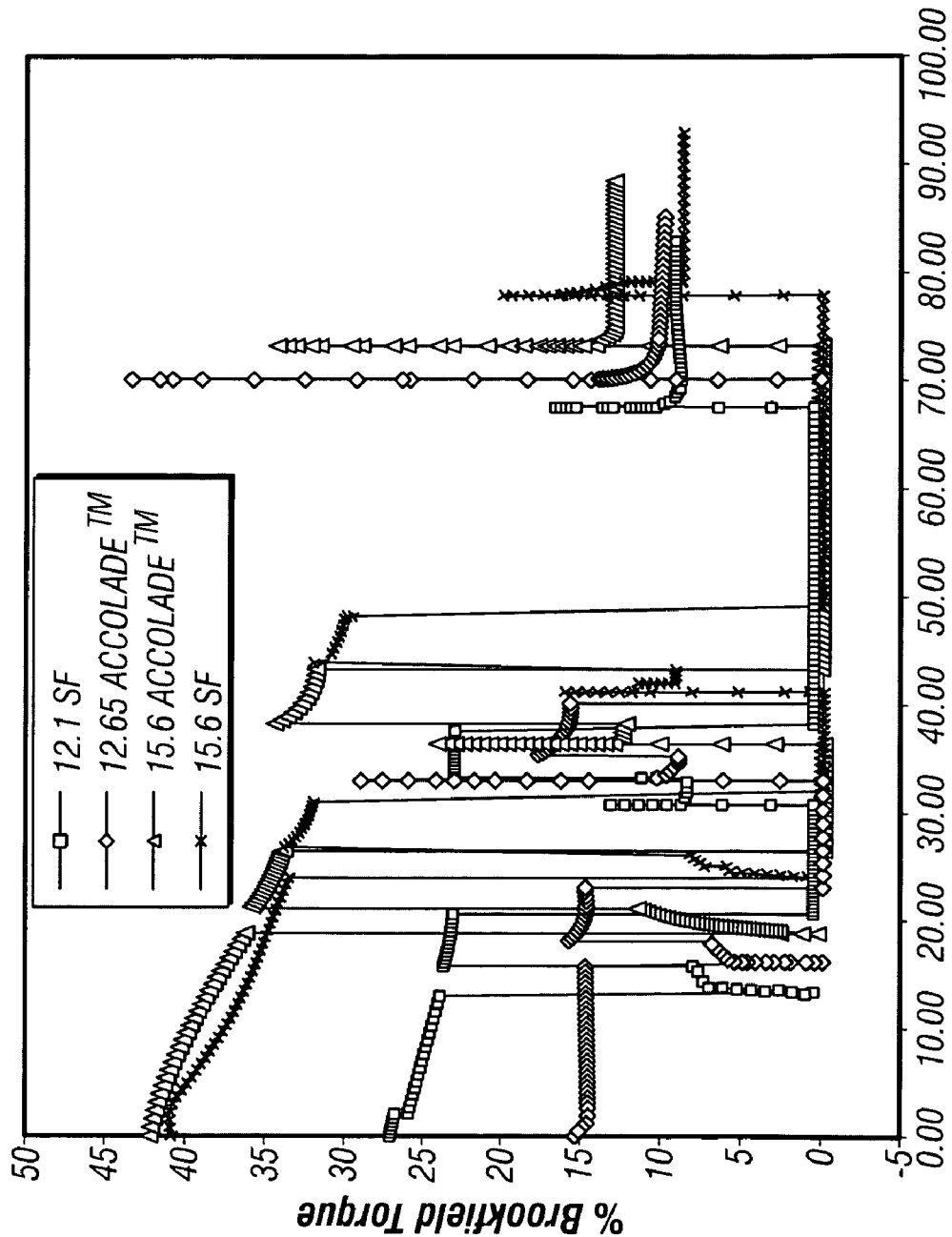
FIG. 3 is a graph indicating "fragile gel" formation in fluids of the present invention and their response when disrupted compared to some prior art isomerized olefin fluids.

FIG. 3 represents in graphical form data indicating gel formation in samples of two different weight (12.65 and 15.6 ppg) ACCOLADE® fluids of the present invention and two comparably weighted (12.1 and 15.6 ppg) prior art invert emulsion fluids (tradename PETROFREE® SF) at 120° F. When the fluids are at rest or static (as when drilling has stopped in the wellbore), the curves are flat or relatively flat (see area at about 50-65 minutes elapsed time for example). When shear stress is resumed (as in drilling), the curves move up straight vertically or generally vertically (see area at about 68 to about 80 elapsed minutes for example), with the height of the curve being proportional to the amount of gel formed—the higher the curve the more gel built up. The curves then fall down and level out or begin to level out, with the faster rate at which the horizontal line forms (and the closer the horizontal line approximates true horizontal) indicating the lesser resistance of the fluid to the stress and the lower the pressure required to move the fluid.

FIG. 3 indicates superior response and performance by the drilling fluids of the present invention. Not only do the fluids of the present invention appear to build up more "gel" when at rest, which enables the fluids of the invention to better maintain weight materials and drill cuttings in suspension when at rest—a time prior art fluids are more likely to have difficulty suspending such solid materials—but the fluids of the present invention nevertheless surprisingly provide less resistance to the sheer, which will result in lower ECDs as discussed further herein.

Figure 4:
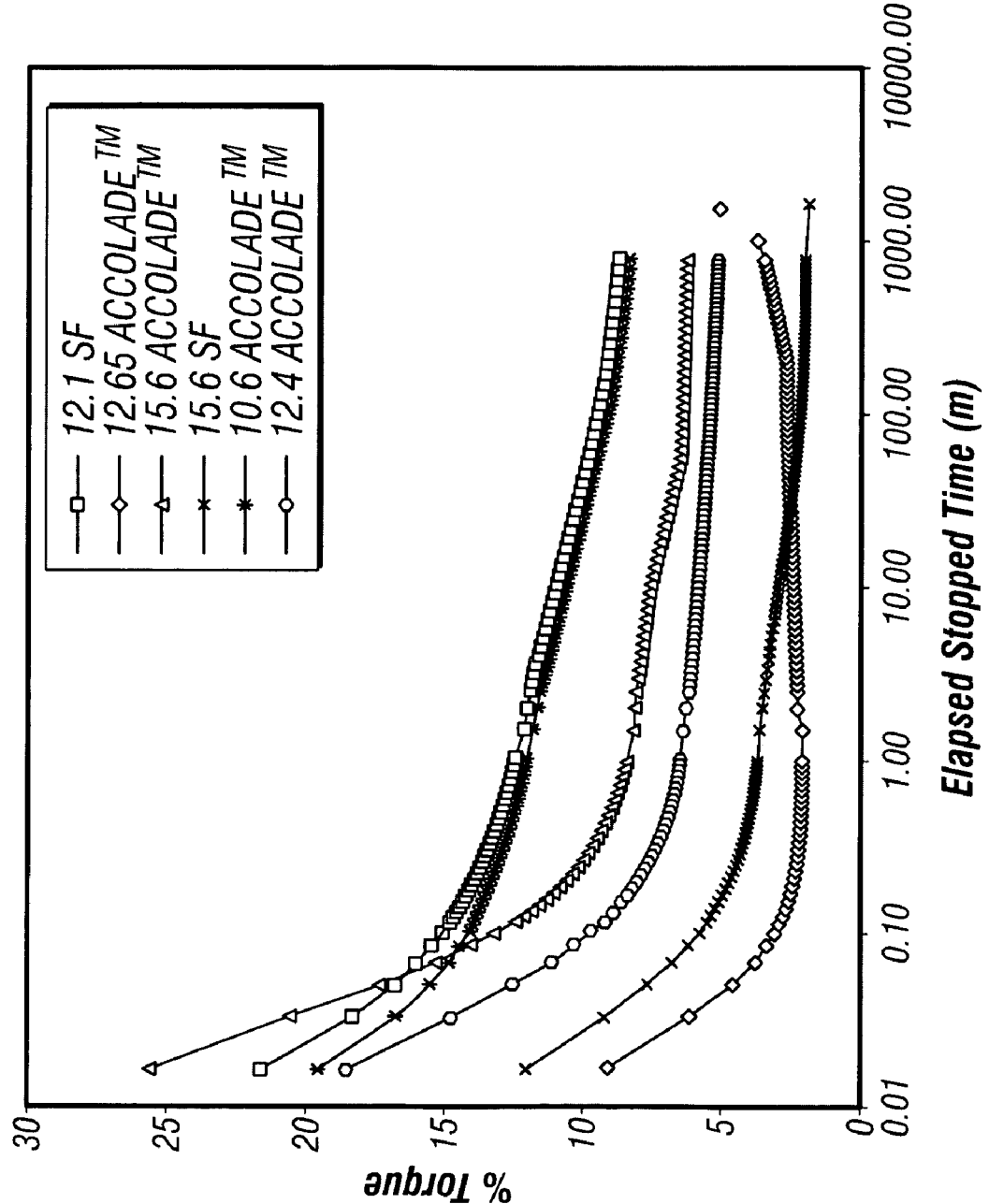
FIG. 4 is a graph comparing the relaxation rates of various prior art drilling fluids and fluids of the present invention.

FIG. 4 provides data further showing the gel or gel-like behavior of the fluids of the present invention. FIG. 4 is a graph of the relaxation rates of various drilling fluids, including fluids of the present invention and prior art isomerized olefin based fluids. In the test, conducted at 120° F., the fluids are exposed to stress and then the stress is removed. The time required for the fluids to relax or to return to their pre-stressed state is recorded. The curves for the fluids of the invention seem to level out over time whereas the prior art fluids continue to decline. The leveling out of the curves are believed to indicate that the fluids are returning to a true gel or gel-like structure.

The significant reduction in fluid loss seen with the present invention can be due in substantial part to the viscoelasticity of the fluids of the present invention. Such viscoelasticity, along with the fragile gel behavior, is believed to enable the fluids of the invention to minimize the difference in its density at the surface and its equivalent circulating density downhole.

Figure 5A:
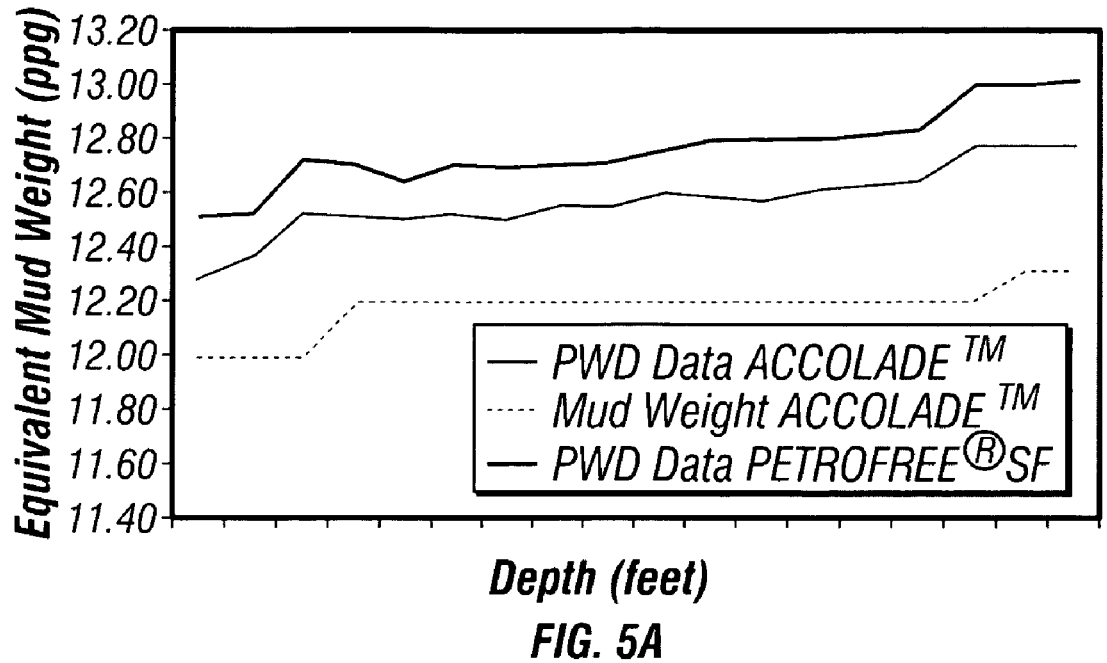
FIG. 5(a) is a graph comparing the differences in well surface density and the equivalent circulating density for a prior art isomerized olefin fluid and for a fluid of the invention in two comparable wells.
Figure 5B:
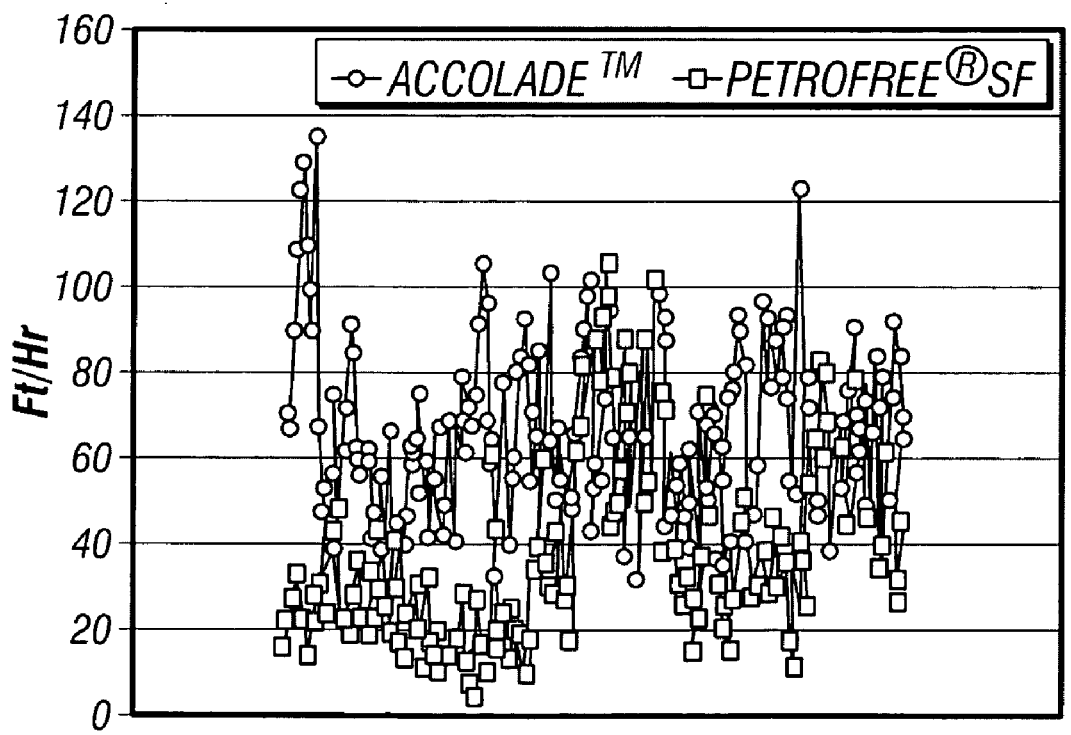
FIG. 5(b) shows the rate of penetration in the wells at the time the density measurements for FIG. 5(a) were being taken.

Table 10 below and FIG. 5(a) showing the Table 10 data in graph form illustrate the consistently stable and relatively minimal difference in equivalent circulating density and actual fluid weight or well surface density for the fluids of the invention. This minimal difference is further illustrated in FIG. 5(a) and in Table 10 by showing the equivalent circulating density downhole for a commercially available isomerized olefin drilling fluid in comparison to a drilling fluid of the present invention. Both fluids had the same well surface density. The difference in equivalent circulating density and well surface density for the prior art fluid however was consistently greater than such difference for the fluid of the invention. FIG. 5(b) provides the rates of penetration or drilling rates at the time the measurements graphed in FIG. 5(a) were made. FIG. 5(b) indicates that the fluid of the invention provided its superior performance—low—ECDs at surprisingly faster drilling rates, making its performance even more impressive, as faster drilling rates tend to increase ECDs with prior art fluids.

TABLE 10

Comparison of Equivalent Circulating Densities

| DEPTH (in feet) | PWD Data ACCOLADE ™ System pump rate: 934 gpm BIT: 12.25" (ppg) | Mud Weight At well surface (ppg) | PWD Data Isomerized Olefin based fluid pump rate: 936 gpm BIT: 12.25" (ppg) |
|---|---|---|---|
| 10600 | 12.29 | 12.0 | 12.51 |
| 10704 | 12.37 | 12.0 | 12.53 |
| 10798 | 12.52 | 12.0 | 12.72 |
| 10,899 | 12.50 | 12.2 | 12.70 |
| 11,001 | 12.50 | 12.2 | 12.64 |
| 11,105 | 12.52 | 12.2 | 12.70 |
| 11,200 | 12.50 | 12.2 | 12.69 |
| 11,301 | 12.55 | 12.2 | 12.70 |
| 11,400 | 12.55 | 12.2 | 12.71 |
| 11,500 | 12.59 | 12.2 | 12.77 |
| 11,604 | 12.59 | 12.2 | 12.79 |
| 11,700 | 12.57 | 12.2 | 12.79 |
| 11,802 | 12.60 | 12.2 | 12.79 |
| 11,902 | 12.62 | 12.2 | 12.81 |
| 12,000 | 12.64 | 12.2 | 12.83 |
| 12,101 | 12.77 | 12.2 | 12.99 |
| 12,200 | 12.77 | 12.3 | 12.99 |
| 12,301 | 12.76 | 12.3 | 13.01 |

Figure 6:
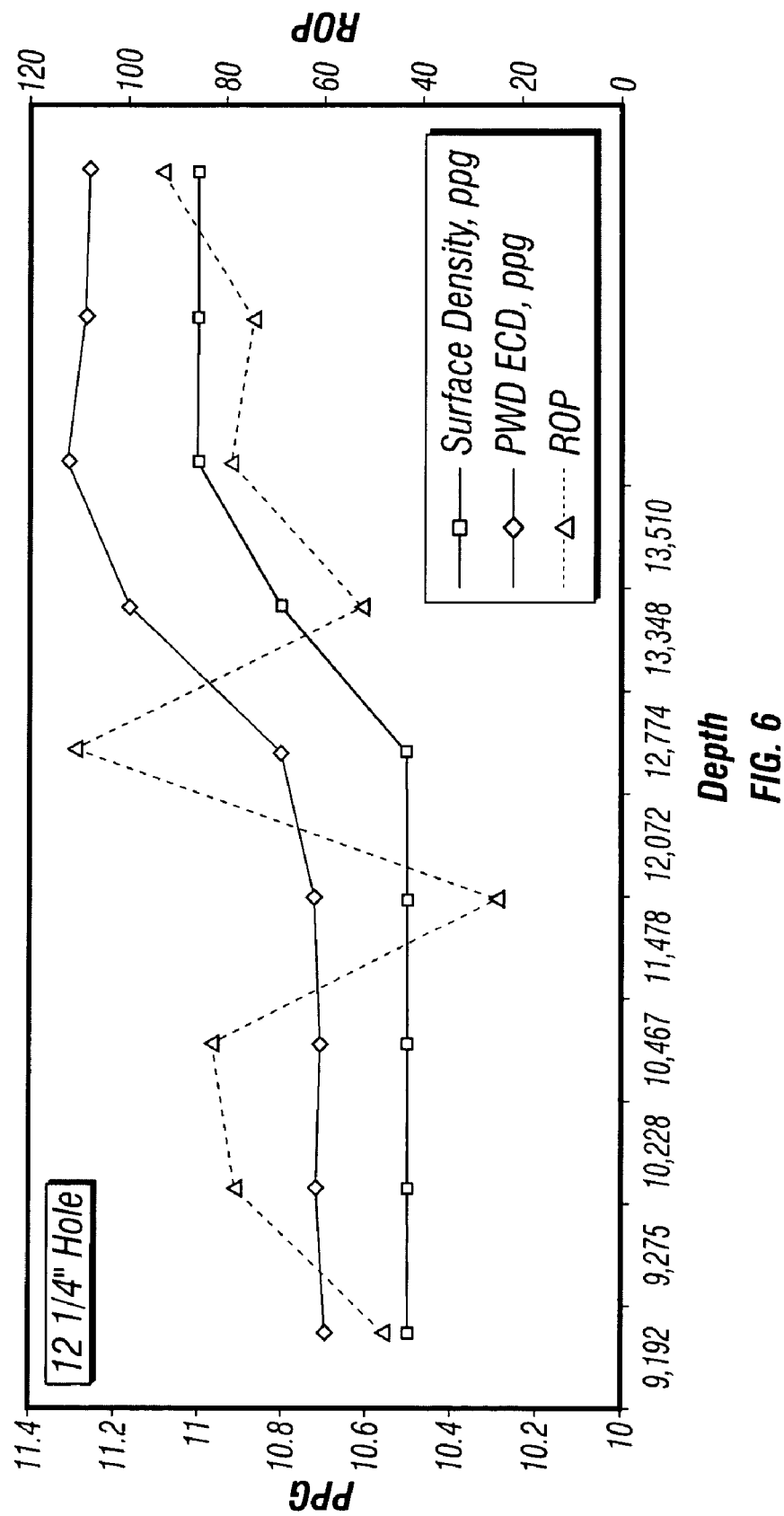
FIG. 6 is a graph comparing the differences in well surface density and the equivalent circulating density for a fluid of the invention with a flowrate of 704 to 811 gallons per minute in a 12¼ inch borehole drilled from 9,192 ft to 13,510 ft in deep water and including rate of penetration.

FIG. 6 graphs the equivalent circulating density of an ACCOLADE™ system, as measured downhole during drilling of a 12¼ inch borehole from 9,192 feet to 13,510 feet in deepwater (4,900 feet), pumping at 704 to 811 gallons per minute, and compares it to the fluid's surface density. Rate of penetration ("ROP") (or drilling rate) is also shown. This data further shows the consistently low and stable ECDs for the fluid, notwithstanding differences in the drilling rate and consequently the differences in stresses on the fluid.

Figure 7:
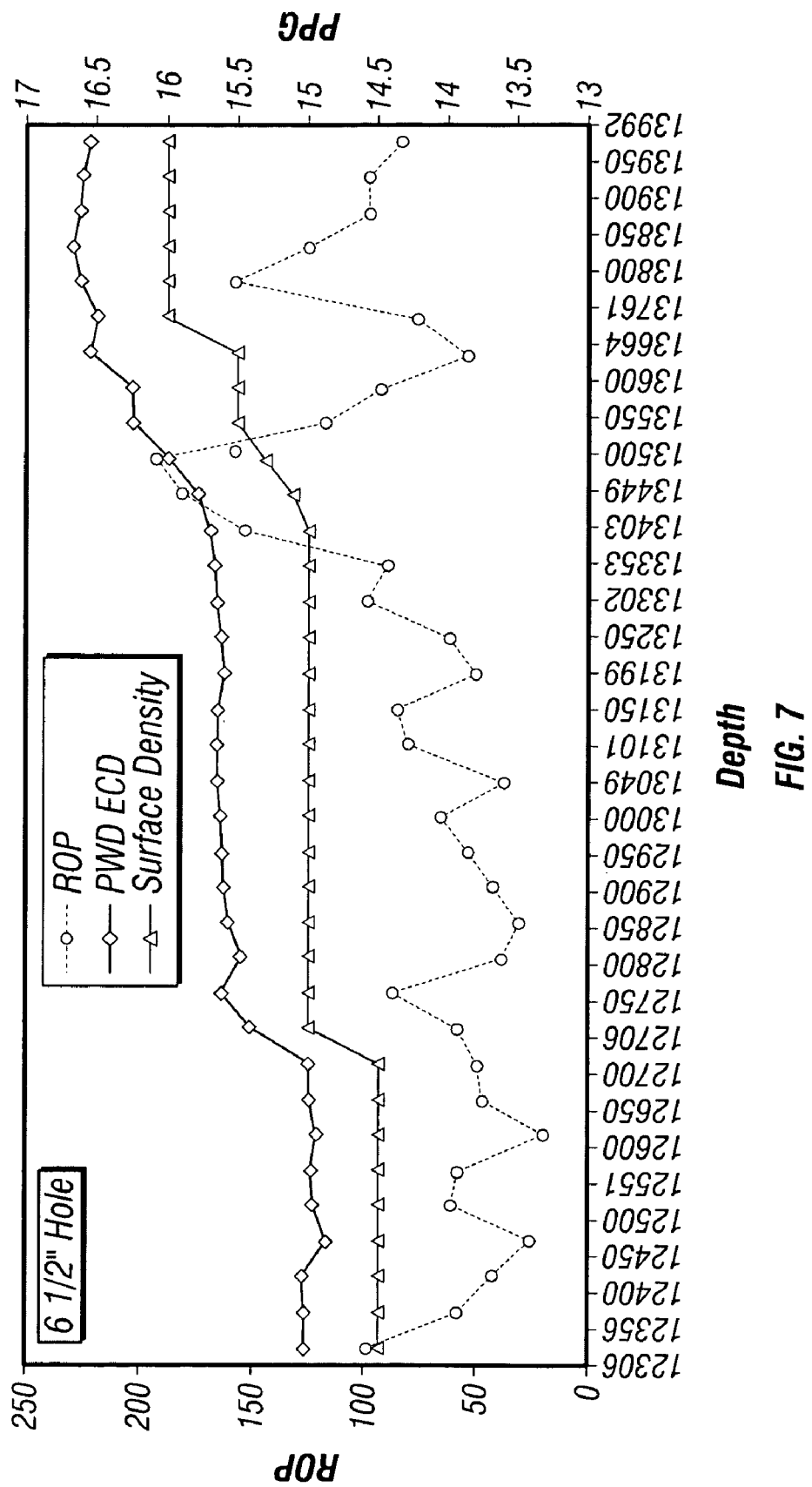
FIG. 7 is a graph comparing the differences in well surface density and the equivalent circulating density for a fluid of the invention with a flowrate of 158 to 174 gallons per minute in a 6½ inch borehole drilled from 12,306 ft to 13,992 ft and including rate of penetration.

FIG. 7 similarly graphs the equivalent circulating density of an ACCOLADE™ system, as measured downhole during drilling of a 6½ inch borehole from 12,306 feet to 13,992 feet, pumping at 158 to 174 gallons per minute in deepwater, and compares it to the fluid's surface density. Rate of penetration (or drilling rate) is also shown. Despite the relatively erratic drilling rate for this well, the ECDs for the drilling fluid were minimal, consistent, and stable. Comparing FIG. 7 to FIG. 6 shows that despite the narrower borehole in FIG. 7 (6½ inches compared to the 12¼ inch borehole for which data is shown in FIG. 6), which would provide greater stress on the fluid, the fluid performance is effectively the same.

Figure 8:
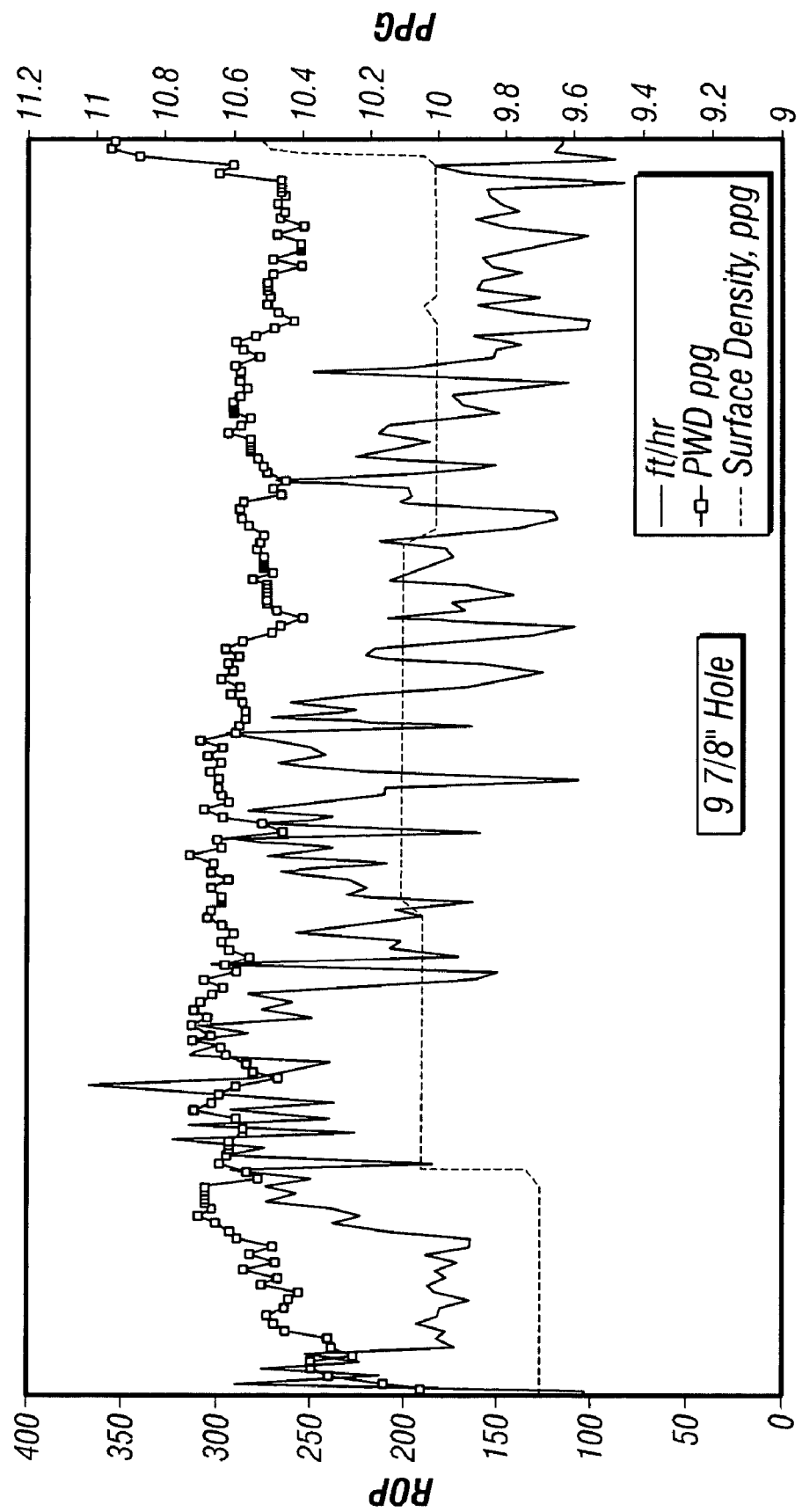
FIG. 8 is a graph comparing the differences in well surface density and the equivalent circulating density for a fluid of the invention at varying drilling rates from 4,672 ft to 12,250 ft, and a flowrate of 522 to 586 gallons per minute in a 9⅞" borehole.

FIG. 8 graphs the equivalent circulating density of an ACCOLADE™ system, as measured downhole during drilling of a 9⅞ inch borehole from 4,672 feet to 12,250 feet in deepwater, pumping at 522 to 585 gallons per minute, and compares it to the surface density of the fluid and the rate of penetration ("ROP") (or drilling rate). The drilling fluid provided low, consistent ECDs even at the higher drilling rates.

Environmental Impact Studies

Figure 12:
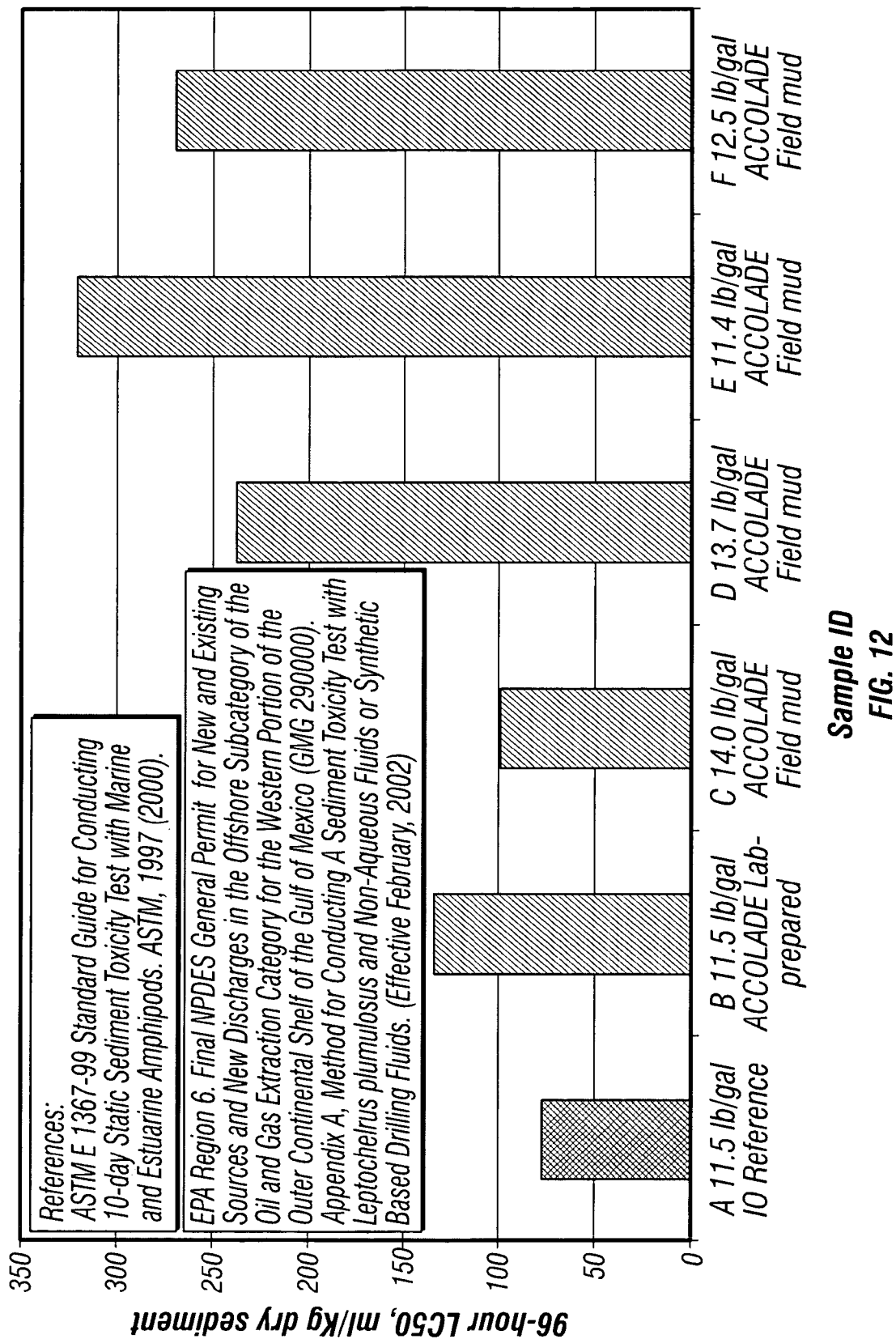
FIG. 12 is a graph showing bioassay results for a 96-hour sediment toxicity test with *Leptocheirus plumulosus*, comparing a reference internal olefin to laboratory and field mud samples of the ACCOLADE™ system.

Table 11 and the graph in FIG. 12 summarize results of an environmental impact 10-day *Leptocheirus* test.

TABLE 11

Synthetic Based Fluids Bioassay
Using 960 Hour Sediment Toxicity Test
With *Leptocheirus plumulosus*

| Sample ID | Target Component Carrier | 96-Hour $LC_{50}$ (ml/Kg dry sediment) | 95% Confidence Interval | % Control Survival |
|---|---|---|---|---|
| A | 11.5 ppg Revised API Reference IO SBM | 77 | 63-93 | 95 |
| B | 11.5 ppg ACCOLADE ™ SBM (lab prep.) | 134 | 117-153 | 95 |

TABLE 11-continued

Synthetic Based Fluids Bioassay
Using 960 Hour Sediment Toxicity Test
With *Leptocheirus plumulosus*

| Sample ID | Target Component Carrier | 96-Hour $LC_{50}$ (ml/Kg dry sediment) | 95% Confidence Interval | % Control Survival |
|---|---|---|---|---|
| C | 14.0 ppg ACCOLADE ™ (Field 1) | 98 | 74-130 | 97 |
| D | 13.7 ppg ACCOLADE ™ (Field 2) | 237 | 189-298 | 98 |
| E | 11.4 ppg ACCOLADE ™ (Field 3) | 319 | 229-443 | 97 |
| F | 17.5 ppg ACCOLADE ™ (Field 4) | 269 | 144-502 | 97 |

As used in Table 11, the abbreviation "IO" refers to the reference isomerized olefin cited in the test, and the abbreviation "SBM" refers to a "synthetic based mud." "SBM" is used in Table 11 to help distinguish laboratory formulations prepared for testing from field mud samples collected for testing (although the field muds also have a synthetic base). The data shows that the ACCOLADE™ samples provided enhanced compatibility with *Leptocheirus*, exceeding the minimum required by government regulations. The test was conducted according to the ASTM E 1367-99 Standard Guide for Conducting 10-day Static Sediment Toxicity Tests with Marine and Estuarine Amphipods, ASTM, 1997 (2000). The method of the test is also described in EPA Region 6. Final NPEDS General Permit for New and Existing Sources and New Discharges in the Offshore Subcategory of the Outer Continental Shelf of the Gulf of Mexico (GMG 290000); Appendix A, Method for Conducting a Sediment Toxicity Test with *Leptocheirus plumulosus* and Non-Aqueous Fluids or Synthetic Based Drilling Fluids (Effective February, 2002). Further, the ACCOLADE™ samples were found to meet and exceed the biodegradability requirements set forth by the United States Environmental Protection Agency.

As indicated above, the advantages of the methods of the invention may be obtained by employing a drilling fluid of the invention in drilling operations. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures. As noted previously, the fluids of the invention afford real-time monitoring and rapid adjustment of the fluid to accommodate changes in such subterranean formation conditions. Further, the fluids of the invention may be recycled during a drilling operation such that fluids circulated in a wellbore may be recirculated in the wellbore after returning to the surface for removal of drill cuttings for example. The drilling fluid of the invention may even be selected for use in a drilling operation to reduce loss of drilling mud during the drilling operation and/or to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:

1. A method for drilling in a subterranean formation comprising:
   providing or using an invert emulsion drilling fluid comprising:
      a continuous phase;
      an internal phase;
      an emulsifier;
      a weighting agent; and
      0 to about 3 pounds per barrel of organophilic clay,
   wherein the drilling fluid:
      has a G'10/G'200 elastic modulus greater than about 2,
      suspends the weighting agent when stresses or forces associated with drilling are reduced or removed from the drilling fluid, and
      produces substantially no pressure spike upon resuming stopped drilling, as detected by pressure-while-drilling equipment or instruments.

2. The method of claim 1 wherein the continuous phase comprises at least one component selected from one of the groups consisting of:
   (i) esters prepared from fatty acids and alcohols, esters prepared from olefins and fatty acids or alcohols;
   (ii) olefins comprising linear alpha olefins, isomerized olefins having a straight chain, olefins having a branched structure, isomerized olefins having a cyclic structure; olefin hydrocarbons;
   (iii) paraffin hydrocarbons comprising linear paraffins, branched paraffins, poly-branched paraffins, cyclic paraffins, isoparaffins;
   (iv) mineral oil hydrocarbons;
   (v) glyceride triesters comprising rapeseed oil, olive oil, canola oil, castor oil, coconut oil, corn oil, cottonseed oil, lard oil, linseed oil, neatsfoot oil, palm oil, peanut oil, perilla oil, rice bran oil, safflower oil, sardine oil, sesame oil, soybean oil, sunflower oil;
   (vi) naphthenic hydrocarbons; and
   (vii) combinations thereof.

3. The method of claim 2 wherein the continuous phase comprises an internal olefin.

4. The method of claim 2 wherein the continuous phase is substantially ester-free.

5. The method of claim 2 wherein the continuous phase comprises an ester and an olefin.

6. The method of claim 1 wherein the drilling fluid further comprises a modified fatty acid rheology modifier.

7. The method of claim 1 wherein the drilling fluid further comprises a copolymer filtration control agent.

8. The method of claim 1 wherein the drilling fluid further comprises a rheology modifier comprising dimeric and trimeric fatty acids.

9. The method of claim 1 wherein the drilling fluid further comprises a methylstyrene/acrylate filtration control agent.

10. The method of claim 1 wherein the drilling fluid comprises organophilic clay present in an amount in the range from greater than 0 to about 3 pounds per barrel.

11. The method of claim 1 wherein the drilling fluid comprises organophilic clay present in an amount from about 1 to about 3 pounds per barrel.

12. The method of claim 1 wherein the drilling fluid is substantially free of lignite.

13. The method of claim 1 wherein the drilling fluid is substantially free of an organophilic filtration control agent.

14. The method of claim 1 wherein the drilling fluid is used in the temperature range of from about 40° F. to about 120° F.

15. The method of claim 1 wherein the drilling fluid has a lower yield point at a temperature of about 40° F. than at a temperature of about 120° F.

16. The method of claim 1 wherein the drilling fluid substantially maintains a difference in measured surface density and equivalent circulating density downhole of less than 0.5 ppg during drilling.

17. The method of claim 1 wherein the drilling fluid is used offshore.

18. The method of claim 1 wherein the drilling fluid is tolerant to drill cuttings.

19. The method of claim 1 wherein the drilling fluid does not exhibit significant sag when at rest.

20. The method of claim 1 wherein the drilling fluid is used in drilling a well with loss of the drilling fluid being less than about 1 barrel per barrel of hole drilled.

21. The method of claim 1 wherein the drilling fluid is used in running casing and cementing with loss of the drilling fluid being less than about 100 barrels of total drilling fluid.

22. The method of claim 1 wherein the drilling fluid is used in drilling, running casing and cementing with loss of the drilling fluid being less than about 500 barrels of total drilling fluid.

23. The method of claim 1 wherein the drilling fluid further comprises a thinner.

24. The method of claim 1 wherein the drilling fluid further comprises a thinner that reduces the viscosity of the drilling fluid at about 40° F. to a greater extent than it reduces the viscosity of the drilling fluid at about 120° F.

25. The method of claim 1 wherein the drilling fluid further comprises one or more additives selected from the group consisting of an emulsion stabilizer, a viscosifier, an HTHP additive, and a water activity lowering material.

26. The method of claim 1 wherein the drilling fluid has a yield point less than about 3 Pa at a shear rate of 3.0 s−1 or less.

27. The method of claim 1 wherein the drilling fluid has a Stress Build Function greater than about 3.0.

28. The method of claim 1 further comprising drilling, running casing and/or cementing a wellbore in the subterranean formation.

29. A method for drilling in a subterranean formation comprising:
   providing or using an invert emulsion drilling fluid comprising:
      a continuous phase;
      an internal phase;
      an emulsifier;
      0 to about 3 pounds per barrel of organophilic clay,
   wherein the drilling fluid:
      has a G'10/G'200 elastic modulus greater than about 2,
      has substantially no sag when stresses or forces associated with drilling are reduced or removed from the drilling fluid, and
      produces substantially no pressure spike upon resuming stopped drilling, as detected by pressure-while-drilling equipment or instruments.

30. The method of claim 29 wherein the continuous phase of the drilling fluid comprises at least one component selected from one of the groups consisting of:
   (i) esters prepared from fatty acids and alcohols, esters prepared from olefins and fatty acids or alcohols;
   (ii) olefins comprising linear alpha olefins, isomerized olefins having a straight chain, olefins having a branched structure, isomerized olefins having a cyclic structure; olefin hydrocarbons;
   (iii) paraffin hydrocarbons comprising linear paraffins, branched paraffins, poly-branched paraffins, cyclic paraffins, isoparaffins;
   (iv) mineral oil hydrocarbons;
   (v) glyceride triesters comprising rapeseed oil, olive oil, canola oil, castor oil, coconut oil, corn oil, cottonseed oil, lard oil, linseed oil, neatsfoot oil, palm oil, peanut oil, perilla oil, rice bran oil, safflower oil, sardine oil, sesame oil, soybean oil, sunflower oil;
   (vi) naphthenic hydrocarbons; and
   (vii) combinations thereof.

31. The method of claim 30 wherein the continuous phase of the drilling fluid comprises an internal olefin.

32. The method of claim 30 wherein the continuous phase of the drilling fluid is substantially ester-free.

33. The method of claim 30 wherein the continuous phase of the drilling fluid comprises an ester and an olefin.

34. The drilling fluid of claim 29 wherein the drilling fluid comprises a weighting agent.

35. The method of claim 29 wherein the drilling fluid further comprises a modified fatty acid rheology modifier.

36. The method of claim 29 wherein the drilling fluid further comprises a copolymer filtration control agent.

37. The method of claim 29 wherein the drilling fluid further comprises a rheology modifier comprising dimeric and trimeric fatty acids.

38. The method of claim 29 wherein the drilling fluid further comprises a methylstyrene/acrylate filtration control agent.

39. The method of claim 29 wherein the drilling fluid comprises organophilic clay present in an amount in the range from greater than 0 to about 3 pounds per barrel.

40. The method of claim 29 wherein the drilling fluid comprises organophilic clay present in an amount from about 1 to about 3 pounds per barrel.

41. The method of claim 29 wherein the drilling fluid is substantially free of lignite.

42. The method of claim 29 wherein the drilling fluid is substantially free of an organophilic filtration control agent.

43. The method of claim 29 wherein the drilling fluid is used in the temperature range of from about 40° F. to about 120° F.

44. The method of claim 29 wherein the drilling fluid has a lower yield point at a temperature of about 40° F. than at a temperature of about 120° F.

45. The method of claim 29 wherein the drilling fluid substantially maintains a difference in measured surface density and equivalent circulating density downhole of less than 0.5 ppg during drilling.

46. The method of claim 29 wherein the drilling fluid is used offshore.

47. The method of claim 29 wherein the drilling fluid is tolerant to drill cuttings.

48. The method of claim 29 wherein the drilling is performed in a wellbore in the subterranean formation at a water depth greater than about 1,500 feet.

49. The method of claim 29 wherein the drilling fluid is used in drilling a well with loss of the drilling fluid being less than about 1 barrel per barrel of hole drilled.

50. The method of claim 29 wherein the drilling fluid is used in running casing and cementing with loss of the drilling fluid being less than about 100 barrels of total drilling fluid.

51. The method of claim 29 wherein the drilling fluid is used in drilling, running casing and cementing with loss of the drilling fluid being less than about 500 barrels of total drilling fluid.

52. The method of claim 29 wherein the drilling fluid further comprises a thinner.

53. The method of claim 29 wherein the drilling fluid further comprises a thinner that reduces the viscosity of the drilling fluid at about 40° F. to a greater extent than it reduces the viscosity of the drilling fluid at about 120° F.

54. The method of claim 29 wherein the drilling fluid further comprises one or more additives selected from the group consisting of an emulsion stabilizer, a viscosifier, an HTHP additive, and a water activity lowering material.

55. The method of claim 29 wherein the drilling fluid has a yield point less than about 3 Pa at a shear rate of 3.0 s−1 or less.

56. The method of claim 29 wherein the drilling fluid has a Stress Build Function greater than about 3.0.

57. The method of claim 29 wherein the drilling fluid is used in drilling, running casing and/or cementing a wellbore in the subterranean formation.

* * * * *